(12) United States Patent
Braun et al.

(10) Patent No.: US 7,593,930 B2
(45) Date of Patent: *Sep. 22, 2009

(54) FAST CHANNEL ARCHITECTURE

(75) Inventors: Bernhard Braun, Rauenberg (DE); Oliver Luik, Wiesloch (DE)

(73) Assignee: SAP AG, Walldorf (DE)

( * ) Notice: Subject to any disclaimer, the term of this patent is extended or adjusted under 35 U.S.C. 154(b) by 277 days.

This patent is subject to a terminal disclaimer.

(21) Appl. No.: 11/013,277

(22) Filed: Dec. 14, 2004

(65) Prior Publication Data

US 2006/0129546 A1  Jun. 15, 2006

(51) Int. Cl.
G06F 17/30 (2006.01)

(52) U.S. Cl. .............................. 707/4; 707/1; 707/100; 707/102; 709/224; 709/227

(58) Field of Classification Search ........................ None
See application file for complete search history.

(56) References Cited

U.S. PATENT DOCUMENTS

| | | | |
|---|---|---|---|
| 5,566,302 A * | 10/1996 | Khalidi et al. | 719/312 |
| 5,566,315 A | 10/1996 | Milillo et al. | |
| 5,617,570 A | 4/1997 | Russell et al. | |
| 5,682,328 A | 10/1997 | Roeber et al. | |
| 5,692,193 A | 11/1997 | Jagannathan et al. | |
| 5,745,778 A | 4/1998 | Alfieri | 395/800.01 |
| 5,805,790 A | 9/1998 | Nota et al. | |
| 5,905,868 A | 5/1999 | Baghai et al. | |
| 5,909,540 A | 6/1999 | Carter et al. | |
| 5,944,781 A | 8/1999 | Murray | |
| 5,951,643 A | 9/1999 | Shelton et al. | |
| 5,999,179 A | 12/1999 | Kekic et al. | |
| 6,075,938 A | 6/2000 | Bugnion et al. | |
| 6,115,712 A * | 9/2000 | Islam et al. | 707/10 |
| 6,115,721 A * | 9/2000 | Nagy | 707/202 |
| 6,167,423 A | 12/2000 | Chopra et al. | |
| 6,199,179 B1 | 3/2001 | Kauffman et al. | |
| 6,216,212 B1 | 4/2001 | Challenger et al. | |
| 6,256,712 B1 | 7/2001 | Challenger | |

(Continued)

FOREIGN PATENT DOCUMENTS

EP  0 459 931 A2  12/1991

(Continued)

OTHER PUBLICATIONS

Casavant, T.L., and Kuhl, J.G., "A Taxonomy of Scheduling in General-Purpose Distributed Computing systems," *IEEE* 14(2):141-154, (1988) XP000039761.

(Continued)

*Primary Examiner*—Cam Y Truong
*Assistant Examiner*—Shyue Jiunn Hwa
(74) *Attorney, Agent, or Firm*—Blakely Sokoloff Taylor & Zafman

(57) ABSTRACT

A system and method are described for performing data processing using shared memory. In one embodiment, a first application programming engine is employed to process first application programming-based requests. Additionally, a second application programming engine is employed to process second application programming-based requests. The first and second application programming engines are integrated using a memory to provide a common access to both the first and second programming engines.

9 Claims, 18 Drawing Sheets

U.S. PATENT DOCUMENTS

| | | |
|---|---|---|
| 6,272,598 B1 | 8/2001 | Arlitt et al. |
| 6,282,566 B1 | 8/2001 | Lee, Jr. et al. |
| 6,295,582 B1 | 9/2001 | Spencer |
| 6,330,709 B1 | 12/2001 | Johnson et al. |
| 6,336,170 B1 * | 1/2002 | Dean et al. .................. 711/147 |
| 6,345,386 B1 | 2/2002 | Delo et al. |
| 6,349,344 B1 | 2/2002 | Sauntry et al. |
| 6,356,946 B1 | 3/2002 | Clegg et al. |
| 6,412,045 B1 | 6/2002 | DeKoning et al. |
| 6,415,364 B1 | 7/2002 | Bauman et al. |
| 6,424,828 B1 | 7/2002 | Collins et al. |
| 6,425,057 B1 | 7/2002 | Cherkasova et al. |
| 6,438,654 B1 | 8/2002 | Elko et al. |
| 6,467,052 B1 | 10/2002 | Kaler et al. |
| 6,553,377 B1 | 4/2003 | Eschelbeck et al. |
| 6,587,937 B1 | 7/2003 | Jensen et al. |
| 6,591,347 B2 | 7/2003 | Tischler et al. |
| 6,601,112 B1 | 7/2003 | O'Rourke et al. |
| 6,615,253 B1 | 9/2003 | Bowman-Amuah |
| 6,640,244 B1 | 10/2003 | Bowman-Amuah |
| 6,643,802 B1 | 11/2003 | Frost et al. |
| 6,654,948 B1 | 11/2003 | Konuru et al. |
| 6,658,478 B1 | 12/2003 | Singhal et al. |
| 6,681,251 B1 | 1/2004 | Leymann et al. |
| 6,687,702 B2 * | 2/2004 | Vaitheeswaran et al. ...... 707/10 |
| 6,738,977 B1 | 5/2004 | Berry et al. |
| 6,760,911 B1 | 7/2004 | Ye |
| 6,766,419 B1 | 7/2004 | Zahir et al. |
| 6,769,022 B1 | 7/2004 | DeKoning et al. |
| 6,772,409 B1 * | 8/2004 | Chawla et al. ............. 717/106 |
| 6,795,856 B1 | 9/2004 | Bunch |
| 6,799,202 B1 | 9/2004 | Hankinson et al. |
| 6,829,679 B2 | 12/2004 | DeSota et al. |
| 6,854,114 B1 | 2/2005 | Sexton et al. |
| 6,879,995 B1 | 4/2005 | Chinta et al. |
| 7,003,770 B1 | 2/2006 | Pang et al. |
| 7,024,512 B1 | 4/2006 | Franaszek et al. |
| 7,024,695 B1 | 4/2006 | Kumar et al. |
| 7,058,957 B1 | 6/2006 | Nguyen |
| 7,089,566 B1 | 8/2006 | Johnson |
| 7,124,170 B1 | 10/2006 | Sibert |
| 7,127,472 B1 | 10/2006 | Enokida et al. |
| 7,127,713 B2 | 10/2006 | Davis et al. |
| 7,130,891 B2 | 10/2006 | Bernardin et al. |
| 7,149,741 B2 | 12/2006 | Burkey et al. |
| 7,155,512 B2 | 12/2006 | Lean et al. |
| 7,165,239 B2 | 1/2007 | Hejlsberg et al. |
| 7,194,761 B1 | 3/2007 | Champagne |
| 7,203,769 B2 | 4/2007 | Schnier |
| 7,216,160 B2 | 5/2007 | Chintalapati et al. |
| 7,237,140 B2 | 6/2007 | Nakamura et al. |
| 7,246,167 B2 | 7/2007 | Kalmuk et al. |
| 7,254,634 B1 | 8/2007 | Davis et al. |
| 7,296,267 B2 | 11/2007 | Cota-Robles et al. |
| 7,302,423 B2 | 11/2007 | De Bellis |
| 7,373,647 B2 | 5/2008 | Kalmuk et al. |
| 7,386,848 B2 | 6/2008 | Cavage et al. |
| 7,395,338 B2 | 7/2008 | Fujinaga |
| 2001/0029520 A1 | 10/2001 | Miyazaki et al. |
| 2002/0049767 A1 | 4/2002 | Bannett |
| 2002/0052914 A1 | 5/2002 | Zalewski et al. |
| 2002/0073283 A1 | 6/2002 | Lewis et al. |
| 2002/0078060 A1 | 6/2002 | Garst et al. |
| 2002/0093487 A1 | 7/2002 | Rosenberg |
| 2002/0099753 A1 | 7/2002 | Hardin et al. |
| 2002/0129264 A1 | 9/2002 | Rowland et al. |
| 2002/0133805 A1 | 9/2002 | Pugh et al. |
| 2002/0147888 A1 | 10/2002 | Trevathan |
| 2002/0169926 A1 | 11/2002 | Pinckney et al. |
| 2002/0174097 A1 * | 11/2002 | Rusch et al. ................... 707/1 |
| 2002/0181307 A1 * | 12/2002 | Fifield et al. ................ 365/208 |
| 2002/0198953 A1 | 12/2002 | O'Rourke et al. |
| 2003/0009533 A1 | 1/2003 | Shuster |
| 2003/0014521 A1 * | 1/2003 | Elson et al. .................. 709/225 |
| 2003/0014552 A1 * | 1/2003 | Vaitheeswaran et al. .... 709/312 |
| 2003/0023827 A1 | 1/2003 | Palanca et al. |
| 2003/0028671 A1 | 2/2003 | Mehta et al. |
| 2003/0037178 A1 * | 2/2003 | Vessey et al. ................ 709/319 |
| 2003/0058880 A1 | 3/2003 | Sarkinen et al. |
| 2003/0084248 A1 | 5/2003 | Gaither et al. |
| 2003/0084251 A1 | 5/2003 | Gaither et al. |
| 2003/0088604 A1 | 5/2003 | Kuck et al. |
| 2003/0093420 A1 | 5/2003 | Ramme |
| 2003/0093487 A1 | 5/2003 | Czajkowski et al. |
| 2003/0097360 A1 | 5/2003 | McGuire et al. |
| 2003/0105887 A1 | 6/2003 | Cox et al. |
| 2003/0115190 A1 * | 6/2003 | Soderstrom et al. ............ 707/3 |
| 2003/0120811 A1 | 6/2003 | Hanson et al. |
| 2003/0131010 A1 | 7/2003 | Redpath |
| 2003/0131286 A1 | 7/2003 | Kaler et al. |
| 2003/0177356 A1 | 9/2003 | Abela |
| 2003/0177382 A1 * | 9/2003 | Ofek et al. .................. 713/200 |
| 2003/0187927 A1 | 10/2003 | Winchell |
| 2003/0191795 A1 | 10/2003 | Bernardin et al. ........... 709/105 |
| 2003/0195923 A1 | 10/2003 | Bloch et al. |
| 2003/0196136 A1 | 10/2003 | Haynes et al. |
| 2003/0200526 A1 | 10/2003 | Arcand |
| 2003/0212654 A1 | 11/2003 | Harper et al. |
| 2003/0229760 A1 | 12/2003 | Doyle et al. |
| 2004/0003033 A1 | 1/2004 | Kamen et al. |
| 2004/0024610 A1 | 2/2004 | Fradkov et al. |
| 2004/0024881 A1 | 2/2004 | Elving et al. |
| 2004/0024971 A1 | 2/2004 | Bogin et al. |
| 2004/0045014 A1 * | 3/2004 | Radhakrishnan ............ 719/328 |
| 2004/0128370 A1 | 7/2004 | Kortright |
| 2004/0167980 A1 | 8/2004 | Doyle et al. |
| 2004/0168029 A1 | 8/2004 | Civlin |
| 2004/0181537 A1 | 9/2004 | Chawla et al. |
| 2004/0187140 A1 | 9/2004 | Aigner et al. |
| 2004/0205144 A1 | 10/2004 | Otake |
| 2004/0205299 A1 | 10/2004 | Bearden |
| 2004/0213172 A1 | 10/2004 | Myers et al. |
| 2004/0215703 A1 | 10/2004 | Song et al. |
| 2004/0221285 A1 | 11/2004 | Donovan et al. |
| 2004/0221294 A1 | 11/2004 | Kalmuk et al. |
| 2005/0021594 A1 | 1/2005 | Bernardin et al. |
| 2005/0021917 A1 | 1/2005 | Mathur et al. |
| 2005/0027943 A1 | 2/2005 | Steere et al. |
| 2005/0044197 A1 | 2/2005 | Lai |
| 2005/0044301 A1 | 2/2005 | Vasilevsky et al. |
| 2005/0055086 A1 | 3/2005 | Buban et al. |
| 2005/0060704 A1 | 3/2005 | Bulson et al. |
| 2005/0086656 A1 | 4/2005 | Whitlock et al. |
| 2005/0086662 A1 | 4/2005 | Monnie et al. |
| 2005/0160396 A1 | 7/2005 | Chadzynski |
| 2005/0188068 A1 | 8/2005 | Kilian |
| 2005/0216502 A1 | 9/2005 | Kaura et al. |
| 2005/0256880 A1 | 11/2005 | Nam Koong et al. |
| 2005/0262181 A1 | 11/2005 | Schmidt et al. |
| 2005/0262493 A1 | 11/2005 | Schmidt et al. |
| 2005/0262512 A1 | 11/2005 | Schmidt et al. |
| 2005/0268238 A1 | 12/2005 | Quang et al. |
| 2005/0268294 A1 | 12/2005 | Petev et al. |
| 2005/0278274 A1 | 12/2005 | Kovachka-Dimitrova et al. |
| 2005/0278346 A1 | 12/2005 | Shang et al. |
| 2006/0053112 A1 | 3/2006 | Chitkara et al. |
| 2006/0053425 A1 | 3/2006 | Berkman et al. |
| 2006/0059453 A1 * | 3/2006 | Kuck et al. .................. 717/100 |
| 2006/0064545 A1 | 3/2006 | Wintergerst |
| 2006/0064549 A1 | 3/2006 | Wintergerst |
| 2006/0070051 A1 * | 3/2006 | Kuck et al. .................. 717/162 |
| 2006/0092165 A1 | 5/2006 | Abdalla et al. |
| 2006/0094351 A1 * | 5/2006 | Nowak et al. ............. 455/13.2 |
| 2006/0129512 A1 | 6/2006 | Braun et al. |

| | | | |
|---|---|---|---|
| 2006/0129546 A1 | 6/2006 | Braun et al. | |
| 2006/0129981 A1 | 6/2006 | Dostert et al. | |
| 2006/0143328 A1 | 6/2006 | Fleischer et al. | |
| 2006/0143359 A1 | 6/2006 | Dostert et al. | |
| 2006/0143389 A1 | 6/2006 | Kilian et al. | |
| 2006/0143609 A1 | 6/2006 | Stanev | |
| 2006/0143618 A1 | 6/2006 | Fleischer et al. | |
| 2006/0143619 A1 | 6/2006 | Galchev et al. | |
| 2006/0150197 A1 | 7/2006 | Werner | |
| 2006/0155867 A1 | 7/2006 | Kilian et al. | |
| 2006/0159197 A1 | 7/2006 | Kraut et al. | |
| 2006/0167980 A1 | 7/2006 | Werner | |
| 2006/0168646 A1 | 7/2006 | Werner | |
| 2006/0168846 A1 | 8/2006 | Juan | |
| 2006/0206856 A1 | 9/2006 | Breeden et al. | |
| 2007/0150586 A1 | 6/2007 | Kilian et al. | |
| 2007/0156907 A1 | 7/2007 | Galchev et al. | |
| 2007/0266305 A1 | 11/2007 | Cong et al. | |

FOREIGN PATENT DOCUMENTS

| | | |
|---|---|---|
| EP | 459931 A2 * | 12/1991 |
| EP | 1380941 | 1/2004 |
| EP | 1027796 | 6/2004 |
| GB | 2365553 | 2/2002 |
| WO | WO/0023898 | 4/2000 |
| WO | WO03073204 | 9/2003 |
| WO | WO2004038586 | 5/2004 |

OTHER PUBLICATIONS

Dandamudi, S.P., "Reducing Run Queue Contention in Shared Memory Multipocessors," *IEEE* pp. 82-89 (1997) XP000657329.
Tanenbaum, A.S., *Modern Operating Systems*, 2nd Edition, Upper Saddle River, New Jersey: Prentice-Hall, Inc., pp. 531-578 (2001). English Translation of: *Moderne Betriebssysteme*, vol. 2, pp. 539-617, (2002) XP002385695.
Yue, K.K. and Lilja, D.J., "An Effective Processor Allocation Strategy for Multiprogrammed Shared-Memory Multiprocessors," *IEEE* 8(12):1246-1258, (1997).
European Application No. 05027367.1, European Search Report.
"JSR 107: JCACHE", *JSR 107: JCACHE—Java Temporary Caching API*, Website, http://web1.jcp.org/en;jsr/detail?id=107, Nov. 28, 2004., 4.
"What is LDAP?", http://www.gracion.com/server/whatldap.html, (Dec. 7, 2004).
Jagannathan, et al., "High-Level Abstraction for Efficient Concurrent Systems", *NEC Research Institute*, Section 5.2, (Mar. 1994), 20.
Oetiker, Tobias, "SEPP Software Installation and Sharing System", *Proceedings of the Twelfth Systems Administration Conference (LISA '98)*, Boston, Massachusetts, (Dec. 6-11, 1998), pp. 253-260.
Pasin, Marcia, et al., "High-Available Enterprise JavaBeans Using Group Communication System Support", Pasin et al., *"High-Available Enterprise JavaBeans Using Group Communication System Support"*, pp. 1-6, XP002285985., 1-6.
Polk, Jennifer, et al., "Oracle Database Net Services Administrator's Guide 10g Release 1 (10.1)", URL: http://download-west.oracle.com/docs/cd/B19306_01/network.102/b14212.pdf>; Oct. 2005; retrieved on Apr. 26, 2007., reference No. XP002431369, (Oct. 2005), 1-29.
Rosenberg, David, "Bringing Java to the Enterprise: Oracle on its Java Server Strategy", *IEEE Internet Computing IEEE USA*, vol. 2, No. 2; Database accession No. 5902816, XP002431362; ISSN: 1089-7801, (Mar. 2, 1998), 52-59.
Salo, Timo, et al., "Object Persistence Beyond Serialization", *Increasing Productivity and Reducing Maintenance, Dr. Dobb's Journal*, M7T Publ., vol. 24, No. 5, May 1999, pp. 5, XP000925486. ISSN: 1044-789X.
Salo, Timo, et al., "Persistence in Enterprise JavaBeans Applications", pp. 3, *JOOP*, Jul. 1999, XP-002142904.
Smits, Thomas, "Unbreakable Java—The Java Server that Never Goes Down", Nov. 2004 pp. 1-5.
Srinivasan, V., et al., "Object Persistence in Object-Oriented Applications", *IBM Systems Journal*, IBM Corp., vol. 36, No. 1, 1997, pp. 11, XP000685709, ISSN: 0018-8670.
Tuttle, Steven, et al., "Understanding LDAP Design and Implemenation", IBM.com Redbooks, (Jun. 2004), 1-774.
Werner, Randolf, "Connection of Clients for Management of Systems", U.S. Appl. No. 11/026,604, filed Dec. 30, 2004.
Werner, Randolf, "Interface for External System Management", U.S. Appl. No. 11/027,812, filed Dec. 29, 2004.
Werner, Randolf, "Security for External System Management", U.S. Appl. No. 11/026,323, filed Dec. 29, 2004.
"Desing Overview", *2003 Sun Microsystems*, http://java.sun.com.j2se/1.5.0/docs/guied/jni/spec/design.html, retrieved on Jan. 18, 2008.
"FOA Mailed Aug. 17, 2007 for U.S. Appl. No. 11/013,278", Whole Document.
"OA Mailed Feb. 5, 2008 for U.S. Appl. No. 11/013,278", Whole Document.
"OA Mailed Mar. 16, 2007 for U.S. Appl. No. 11/013,278", Whole Document.
"FOA Mailed Aug. 28, 2007 for U.S. Appl. No. 11/012,803", Whole Document.
"OA Mailed Jan. 24, 2008 for U.S. Appl. No. 11/012,803", Whole Document.
"OA Mailed Mar. 16, 2007 for U.S. Appl. No. 11/012,803", Whole Document.
"OA Mailed Jan. 24, 2008 for U.S. Appl. No. 11/024,393", Whole Document.
"OA Mailed Feb. 21, 2008 for U.S. Appl. No. 11/027,812", Whole Documents.
"OA Mailed Jan. 10, 2008 for U.S. Appl. No. 11/027,387", Whole Document.
"OA Mailed Apr. 19, 2007 for U.S. Appl. No. 11/027,387", Whole Document.
"All Classes", http://www.jdocs.com/osche/2.0.2/api/com/opensymphony/oscache/base/allclases-frame.html, (Jan. 2004), 1.
"All Classes, Packages", http://www.jdocs.com/osche/2.0.2/api/overview-frame.html, *OSCache 2.0.2*, (Jan. 2004), 1.
"Caching with IBM WebSphereMQ", *spiritcache, Use Case & Code Example*, article, (Nov. 19, 2004), 1-9.
"Class AbstractCacheAdministrator", http://www.jdocs.com/osche/2.0.2/api/com/opensymphony/oscache/base/AbstractCache.html, (Jan. 2004), 1-11.
"Class Cache", http://www.jdocs.com/osche/2.0.2/api/com/opensymphony/oscache/base/Cache.html, (Jan. 2004), 1-16.
"Class CacheEntry", http://www.jdocs.com/osche/2.0.2/api/com/opensymphony/oscache/base/CacheEntry.html, (Jan. 2004), 1-8.
"Class Config", http://www.jdocs.com/osche/2.0.2/api/com/opensymphony/oscache/base/Config.html, (Jan. 2004), 1-4.
"EP 05027361, European Search Report", (Mar. 28, 2006), Whole Document.
"Failover for Clustered RMI-P4 Remote Objects", *SAP Library*, http://help.sap.com/saphelp_nw04/helpdata/en/f6/4ef11ab3a52f408aa8a133f33d6cf1/cont, (Nov. 2004), 1-3.
"Failover for Enterprise Beans", *SAP Library*, http://help.sap.com/saphelp_nw04/helpdata/en/8f/d6e45953a494499ea1b79ab16321d2/cont, (Nov. 2004), 1-3.
"Failover System", *SAP Library*, http://help.sap.com/saphelp_nw04/helpdata/en/d7/57af0cce55143be5de3a6e4911186.cont, (Nov. 2004), 2.
"High Availability and Failover", *SAP Library*, http://help.sap.com/saphelp_nw04/helpdata/en/6c/209da105668c45be12f1d9cc412e2b/cont, (Nov. 2004), 1-2.
"Http Sessions and Failover of Web Application", *SAP Library*, http://help.sap.com/saphelp_nw04/helpdata/en/90/044cc585eaba42b649f16181b0fdf/cont., (Nov. 2004), 1.
"Introducing Cache-Forward Architecture", *ObjectStore, paper*, (Jan. 1, 2004), 1-23.
"Java Technology in SAP Web Application Server", *SAP Library*, http://help.sap.com/saphelp_nw04/helpdata/en/0d/a3bbeff62847ae10000000a114084/cont, (Nov. 2004), 1-3.
"Java VineetB-log.java", http://homepaqe.mac.com/vineetb/iblog/C684524823/, (Dec. 18, 2003), 1.

"JCS Plugin Overview", http://jakarta.apache.org/jcs/Plugins.html, (Jul. 2004), 2.

"JSR 107: JCACHE-Java Temporary Caching API", http://jcp.org/en/jsr/detail?id=107, (Mar. 20, 2001), 5.

"Load Balancing of the SAP Web As for Java Applications", *SAP Library*, http://help.sap.com/saphelp_nw04/helpdata/en/b5/e8239ef7bd494f896a84625d4b688f/cont., (Nov. 2004), 2.

"Managers—Intro", http://db.apache.org/torque-32/managers-cache.html, (Apr. 11, 2002), 1-4.

"Open Source Cache Solutions in Java", http://java-source.net/open-source/cache-solutions, (Nov. 2004), 1-3.

"OSCache", http://www.opensymphony.com/oscache, (Nov. 2004), 1.

"OSCache 2.0.2", http://www.jdocs.com/osche/2.0.2/api/com/opensymphony/oscache/base/overview-frame.html, (Jan. 2004), 1.

"OSCache, V 2.0.2 API Specification", http://www.jdocs.com/osche/2.0.2/api/com/opensymphony/oscache/base/overview-sum.html, (Jan. 2004), 2.

"SAP Beefs Up Java Support Capabilities for New NetWeaver", *News Story*, (Computerworld). http:www.computerworld.com/printthis/2004/0,4814,96558,00.html, (Oct. 11, 2004), 1-2.

"Sap NetWever Makes Standard Java Robust", http://www.sap.com/company/press/press.epx?pageview=print&pressid=3069, (Oct. 5, 2004), 1-2.

"SAP Presents New Capabilities for Netweaver", *InfoWorld*, http://www.infoworld.com/article/04/10/06/HNsapnetweaver_1.html, (Oct. 6, 2004), 1-5.

"Shared disk I/O cache", IP.Com Journal, IP.Com Inc., West Henrietta, XP013014199 ISSN: 1533-0001, (Jan. 29, 2004), 6.

"spiritcache", http://www.spirit-soft.com/index.do?id=30, (Nov. 2004), 1.

"System and Method for Shared Memory/File System Java ObjectGroup Clustered JVM", http://www.priorartdatabase.com/IPCOM/000021597/, (Jan. 2004), 3.

"turbine-jcs-dev", http://www.mail-archive.com/turbine-jcs-dev@jakarta.apache.org/msg00647.html, (Jul. 13, 2004), 1-3.

"Using Rules-based Object Caching: Allocating dataresources for best service levels to profitable customers", *spiritcache, White paper*, (Nov. 2004), 1-8.

"WebLogic RMI Features and Guidelines", *eDocs*, http://e-docs.bea.com/wls/docs90/rmi/rmi_api.html, (Nov. 2004), 1-7.

Bortvedt, Jerry, "Functional Specification for Object Caching Service for Java (OCS4J), 2.0", (Aug. 9, 2000), pp. 1-27.

Bryce, Ciaran , "Isolates: A New Approach to Multi-Programming in Java Platforms", *LogOn Technology Transfer, Kronerg, Germany, Experts' Corner*, (May 2004), 7

Conte, Thomas, "Implementing OSCache", http://www.pas.net/tom/articles/oscache/en/, (Jun. 2002), 1-4.

Czajkowski, Grzegorz , et al., "A Multi-User Virtual Machine", *Paper, Sun Microsystems Laboratories and S3 Lab*, Purdue University, West Lafayette, IN, (2003), 14.

Czajkowski, Grzegorz , "Multitasking without Compromise: A Virtual Machine Evolution", *Paper, Sun Microsystems Laboratories*, (2001), 1-14.

Czajkowski, Grzegorz , "Multitasking Without Compromise: a Virtual Machine Evolution", *Paper, Sun Microsystems Laboratories*, 2001, pp. 1-14.

Dagfinn, Parnas , "SAP Virtual Machine Container", https://webloqs.sdn.sap.com/pub/wlg/940, (Oct. 23, 2004), 1-4.

Davies, Robert , "Data Caching: A Prerequisite to the Enterprise Service Bus", *Business Integration Journal*, Oct. 2003 , 41-44.

Dillenbeger, D. , et al., "Building a java Virtual Machine For Serve Applications: The JVM On Os/390", *IBM Systems Journal*, vol. 39, No. 1, (2000), 194-210.

Doyle, Patrick, et al., "A Modular and Extensible JVM Infrastructure", *Paper, Edward S. Rogers Sr. Department of Electrical and Computer Engineering*, University of Toronto, Toronto, Ontario, Canada, (Jul. 2002), 14.

Dwarkadas, Sandhya , et al., "Cashmere-VLM: Remote Memory Paging for Software Distributed Shared Memory", *Paper, Compaq Cambridge Research Lab*, Cambridge, MA and Department of Computer Science, University of Rochester, Rochester, NY, (Apr. 1999), 7.

Ferguson, Renee B., "SAP Preps New NetWeaver Capabilities", eWeek.com. http://www.eweek.com/article2/0,1759,1668146,00.asp, (Oct. 7, 2004), 1-6.

Gontmakher, Alex, et al., "Characterizations for Java Memory Behavior", *Paper, Computer Science Department, Technion*, (1997), 5.

Jagannathan, "High-Level Abstraction for Efficient Concurrent Systems", *NEC Research Institute*, Section 5.2, (Mar. 1994), 20.

Jordan, Mick , et al., "Extending a J2EE Server with Dynamic and Flexible Resource Management", *Paper, Sun Microsystems, Inc, and School of Computer Science*, University of Warterloo, Waterloo, ON, Canada, (Oct. 2004), 20.

Jordan, Mick , et al., "Scaling J2EE Application Servers with the Multi-Tasking Virtual Machine", Paper, Sun Microsystems, SMLI TR-2004-135, Jun. 2004, pp. 1-19.

Kuck, Norbert , et al., "SAP VM Container: Using Process Attachable Virtual machines to Provide Isolation and Scalability For Large Servers", *Article, SAP AG*, Walldorf, Germany, (2002), 1-2.

Loosco, Marcelo , et al., "A New Distributed Java Virtual Machine for Cluster Computing", *Notes in Computer Science*, Springer-Verlag, v. 2790, (2003), 1207-1215.

Luck, Greg, "Ehcache 1.0 released", http://www.theserverside.com/news, (Oct. 9, 2004), 1-5.

March, Andres , "OSCache: Change Log", http://www.opensymphony.com/oscache/wiki/Change%20Log.html, (Jan. 18, 2004), 1-11.

Marinescu, Floyd , "SpiritSoft Announces Availability of SpiritCache 2.0", http://www.theserverside.com/news/thread.tss?thread_id=18483, (Mar. 21, 2003), 1-5.

Movva, Sudhir , et al., "Transparent Clustered Database Failover Using JAVA", http://www.quest-pipelines.com/newsletter-v5/060.4_A.htmI, (Apr. 2004), 11.

Parnas, Dagfinn , "SAP Virtual Machine Container", https://weblogs.sdn.sap.com/pub/wlg/904, (Oct. 23, 2004), 1-4.

Penchikala, Srini , "J2EE Object-Caching Frameworks", http://www.javaworld.com/javaworld/jw-05-2004-/jw-0531-cache_p.html, (May 31, 2004), Whole Document.

Penchikala, Srini , "Object Caching in a Web Portal Application Using JCS", http://www.onjava.com/pub/a/onjava/2003/caching.html, (Dec. 23, 2003), 1-18.

Petev, Petio G., et al., "First in First Out Eviction Implementation", U.S. Appl. No. 11/024,546, filed Dec. 28, 2004, Office Action mailed Apr. 6, 2007, claims as they stood in the application prior to the mailing of the Office Action and cl, (Dec. 28, 2004), Whole Document.

Petev, Petio G., et al., "Size Based Eviction Implementation", U.S. Appl. No. 11/024,591, filed Dec. 28, 2004 Office Action mailed Apr. 13. 2007, claims as they stood in the application prior to the mailing of the Office Action and claims pr, (Dec. 28, 2004), Whole Document.

Smits, Thomas, "Unbreakable Java—The Java Server that Never Goes Down", *Article, SAP TechED*, Nov. 2004, San Diego and Munich, 1-5.

Stark, "Concurrent Programming in Java", *CS2 Advanced Programming in Java note 9*, S2Bh, (Jan. 3, 2002), 1-5.

Tullman, Patrick , et al., "Janos: a Java-Oriented OS for Active Network Nodes", *Paper, Flux Research Group*, University of Utah, (Mar. 2001), 14.

Wintergerst, Michael , et al., "Programming Models for Eviction Policies", U.S. Appl. No. 11/025,178, filed Dec. 28, 2004, Office Action mailed Feb. 1, 2007, claims as they stood in the application prior to the mailing of the Office Action, (Dec. 28, 2004), Whole Document.

Office Action mailed Mar. 11, 2008 for U.S. Appl. No. 11/024,591, pp. 15, 15.

Office Action mailed Mar. 17, 2008 for U.S. Appl. No. 11/024,565, pp. 18, 18.

Office Action mailed Jun. 19, 2008 for U.S. Appl. No. 11/024,565, pp. 22, 22.

"FOA Mailed Aug. 13, 2008 for U.S. Appl. No. 11/013,278 Whole Document".

"OA Mailed Mar. 31, 2008 for U.S. Appl. No. 11/025,378", Whole Document.

Barker, et al., "A load balancing framework for adaptive and asynchronous applications", *Parallel and Distributed Systems, IEEE Transactions* on vol. 15, Issue 2, (Feb. 2004), pp. 183-192.

Bresch, Stefan, "Object-relational mapping system and method for generic relationships", U.S. Appl. No. 10/864,185, filed Jun. 08, 2004—Final Office Action mailed Mar. 17, 2008.

Galchev, Galin, "Plug-In Based Caching Architecture Capable of Implementing Multiple Cache Regions Per Application", U.S. Appl. No. 11/024,554, filed Dec. 28, 2004—Non-Final Office Action mailed May 28, 2008, 7 pgs.

Nikolov, Nikolai, "Execution of modified byte code for debugging, testing and/or monitoring of object oriented software", U.S. Appl. No. 10/749,617, filed Dec. 30, 2003—Non-Final Office ction mailed Apr. 09, 2008.

Petev, Petio, et al., "Least frequently used eviction implementation", U.S. Appl. No. 11/024,565 filed Dec. 28, 2004—Non-Final Office Action mailed Jun. 19, 2008, 20.

Petev, Petio G., "Programming Models for Storage Plug-Ins", U.S. Appl. No. 11/024,651, filed Dec. 28, 2004—Non-Final Office Action mailed, Mar. 14, 2008, 11 pgs.

Surdeanu, et al., "Design and performance analysis of a distributed Java Virtual Machine", *Parallel and Distributed Systems, IEEE Transactions* on vol. 13, Issue 6, (Jun. 2002), pp. 611-627.

USPTO, "FOA Mailed Aug. 14, 2008 for U.S. Appl. No. 11/025,378", Whole Document.

USPTO, "OA Mailed Jun. 27, 2008 for U.S. Appl. No. 11/024,391", Whole Document.

USPTO, "FOA Mailed Aug. 19, 2008 for U.S. Appl. No. 11/027,812", Whole Document.

USPTO, "OA Mailed Sep. 4, 2008 for U.S. Appl. No. 11/026,323", Whole Document.

USPTO, "OA Mailed Oct. 3, 2008 for U.S. Appl. No. 11/027,387", Whole Document.

USPTO, "FOA Mailed Sep. 17, 2008 for U.S. Appl. No. 11/024,392", Whole Document.

USPTO, "OA Mailed Apr. 4, 2008 for U.S. Appl. No. 11/024,392", Whole Document.

USPTO, "Non-Final Office Action", U.S. Appl. No. 11/322,057, Whole document.

Notice of Allowance for U.S. Appl. No. 11/024,392, Mailed Mar. 12, 2009, 11 pages.

Final Office Action for U.S. Appl. No. 11/012,803, Mailed Jul. 22, 2008, 22 pages.

Notice of Allowance for U.S. Appl. No. 11/024,393, Mailed Apr. 1, 2009, 8 pages.

Office Action for U.S. Appl. No. 11/025,200, Mailed Mar. 24, 2009, 14 pages.

Office Action for U.S. Appl. No. 11/025,514, Mailed Apr. 3, 2009, 12 pages.

Non-Final Office Action for U.S. Appl. No. 11/027,812, Mailed Apr. 2, 2009, 19 pages.

Bortvedt, Jerry, "Functional Specification for Object Caching Service for Java (OCS4J) 2.0", retrieved from http://jcp.org/en/jsr/detail?id=107, (Mar. 2001).

USPTO, "OA Mailed Oct. 29, 2008 for U.S. Appl. No. 11/149,562", Whole Document.

USPTO, "FOA Mailed Aug. 22, 2007 for U.S. Appl. No. 11/025,378", Whole Document.

USPTO, "OA Mailed Jan. 21, 2009 for U.S. Appl. 11/025,378", Whole Document.

USPTO, "OA Mailed Apr. 19, 2007 for U.S. Appl. No. 11/025,378", Whole Document.

Non-Final Office Action for U.S. Appl. No. 11/024,924, Mailed Apr. 24, 2009, 15 pages.

Non-Final Office Action for U.S. Appl. No. 11/024,394 dated Apr. 27, 2009; 33 pages.

Final Office Action for U.S. Appl. No. 11/024,524 dated Apr. 27, 2009; 21 pages.

Final Office Action for U.S. Appl. No. 11/024,554 Mailed Nov. 26, 2008, 15 pages.

Non-Final Office Action for U.S. Appl. No. 11/024,393 Mailed Nov. 26, 2008, 29 pages.

Non-Final Office Action for U.S. Appl. No. 11/013,278 Mailed Dec. 23, 2008, 28 pages.

Non-Final Office Action for U.S. Appl. No. 11/012,803, Mailed Dec. 23, 2008, 22 pages.

Non-Final Office Action for U.S. Appl. No. 11/026,604, Mailed Dec. 30, 2008, 18 pages.

Final Office Action for U.S. Appl. No. 11/025,514, Mailed Jan. 8, 2009, 10 pages.

Non-Final Office Action for U.S. Appl. No. 11/322,596, Mailed Jan. 23, 2009, 12 pages.

Non-Final Office Action for U.S. Appl. No. 11/026,604, Mailed Jan. 27, 2009, 18 pages.

Non-Final Office Action for U.S. Appl. No. 11/119,08, mailed Oct. 6, 2008, Whole Document.

Non-Final Office Action for U.S. Appl. No. 11/024,924, Mailed Apr. 10, 2008, 16 pages.

Final Office Action for U.S. Appl. No. 11/024,924, Mailed Oct. 8, 2008, 9 pages.

Non-Final Office Action for U.S. Appl. No. 11/025,525, Mailed Feb. 19, 2009, 15 pages.

Notice of Allowance for U.S. Appl. No. 11/027,387, Mailed Feb. 23, 2009, 8 pages.

Notice of Allowance for U.S. Appl. No. 11/026,323, Mailed Feb. 25, 2009, 19 pages.

Non-Final Office Action for U.S. Appl. No. 11/024,524, Mailed Nov. 12, 2008, 31 pages.

Cheung, KC, et al., "Lightweight Trace and Interpreter for Interprocess Timing Problems", IP.COM Journal, IP.COM Inc., West Henrietta, NY, US, XP013096988, ISSN: 1533-0001, (Jun. 1, 1992), Whole Document.

EPO, "EP Search Report Mailed Jun. 4, 2008 for EP Patent Application 05027365.5-1225", Whole Document.

Tanenbaum, Andrew S., "Structured Computer Organization", Prentice-Hall, Inc. 2nd Edition, (1984), 10-12.

Viswanathan, D., et al., "Java Virtual Machine Profiler Interface", IBM Systems Journal IBM USA, vol. 39, No. 1, XP002481425, ISSN: 0018-8670, (2000), 82-95.

Wolczko, Mario., "Using a Tracing Java Virtual Machine to Gather Data on the Behavior of Java Programs", Internet Citation, XP002375976, http://research.sun.com/people/mario/tracing-jvm/tracing.pdf, (Retrieved on Apr. 6, 2006), Whole Document.

* cited by examiner

FAST CHANNEL ARCHITECTURE

BACKGROUND

1. Field of the Invention

This invention relates generally to data processing. More particularly, an embodiment relates to a system and method for performing data processing using shared memory.

2. Description of the Related Art

Traditional client-server systems employ a two-tiered architecture such as that illustrated in FIG. 1A. Applications 102 executed on the client-side 100 of the two-tiered architecture are comprised of a monolithic set of program code including a graphical user interface (GUI) component, presentation logic, business logic and a network interface that enables the client 100 to communicate over a network 103 with one or more servers 101. A database 104 maintained on the server 101 provides non-volatile storage for the data accessed and/or processed by the application 102.

As is known in the art, the "business logic" component of the application represents the core of the application, i.e., the rules governing the underlying business process (or other functionality) provided by the application. The "presentation logic" describes the specific manner in which the results of the business logic are formatted for display on the user interface. The "database" 104 includes data access logic used by the business logic to store and retrieve data.

The limitations of the two-tiered architecture illustrated in FIG. 1A become apparent when employed within a large enterprise. For example, installing and maintaining up-to-date client-side applications on a large number of different clients is a difficult task, even with the aid of automated administration tools. Moreover, a tight coupling of business logic, presentation logic and the user interface logic makes the client-side code very brittle. Changing the client-side user interface of such applications is extremely hard without breaking the business logic, and vice versa. This problem is aggravated by the fact that, in a dynamic enterprise environment, the business logic may be changed frequently in response to changing business rules. Accordingly, the two-tiered architecture is an inefficient solution for enterprise systems.

In response to limitations associated with the two-tiered client-server architecture, a multi-tiered architecture has been developed, as illustrated in FIG. 1B. In the multi-tiered system, the presentation logic 121, business logic 122 and database 123 are logically separated from the user interface 120 of the application. These layers are moved off of the client 125 to one or more dedicated servers on the network 103. For example, the presentation logic 121, the business logic 122, and the database 123 may each be maintained on separate servers, 126, 127 and 128, respectively.

This separation of logic components and the user interface provides a more flexible and scalable architecture compared to that provided by the two-tier model. For example, the separation ensures that all clients 125 share a single implementation of business logic 122. If business rules change, changing the current implementation of business logic 122 to a new version may not require updating any client-side program code. In addition, presentation logic 121 may be provided which generates code for a variety of different user interfaces 120, which may be standard browsers such as Internet Explorer® or Netscape Navigator®.

The multi-tiered architecture illustrated in FIG. 1B may be implemented using a variety of different application technologies at each of the layers of the multi-tier architecture, including those based on the Java 2 Platform, Enterprise Edition™ (J2EE) standard, the Microsoft®.NET™ standard and/or the Advanced Business Application Programming™ (ABAP) standard developed by SAP AG.

For example, in a J2EE environment, such as the one illustrated in FIG. 1C, the business layer 122 is to handle the core business logic of the application having Enterprise Java-Bean™ (EJB or enterprise bean) components with support for EJB containers 134. While the presentation layer 121 is responsible for generating servlets and Java ServerPages™ (JSP or JSP pages) interpretable with support for Web containers 132 by different types of browsers at the client 125 via a web server 136 a network 103 (e.g., Internet or intranet).

In recent years, as business application development projects have grown larger and more diversified, integration of business applications in terms of people, information, and processed is becoming increasingly important. SAP® NetWeaver™ was developed and presented by SAP AG with core capabilities to provide a solution for the integration of people, information, and processes.

However, the integration of people, information, and process is resulting in an ever increasing demand for high-level planning, maintenance, and administration, which in turn, requires the underline architecture and environment to conform to, for example, platform independence, inter-process communication, increased security, development versioning, multi-user possibility, shared memory, and efficient class-loading. For example, it would be useful to have an architectural environment that provides increased robustness, improved integration, better monitoring, reduced memory footprint, decreased internal threads, faster session failover, and shared memory.

SUMMARY

A system and method are described for performing data processing using shared memory. In one embodiment, a first application programming engine is employed to process first application programming-based requests. Additionally, a second application programming engine is employed to process second application programming-based requests. The first and second application programming engines are integrated using a memory to provide a common access to both the first and second programming engines.

BRIEF DESCRIPTION OF THE DRAWINGS

The appended claims set forth the features of the invention with particularity. The embodiments of the invention, together with its advantages, may be best understood from the following detailed description taken in conjunction with the accompanying drawings in which:

DETAILED DESCRIPTION

Figure 1A:
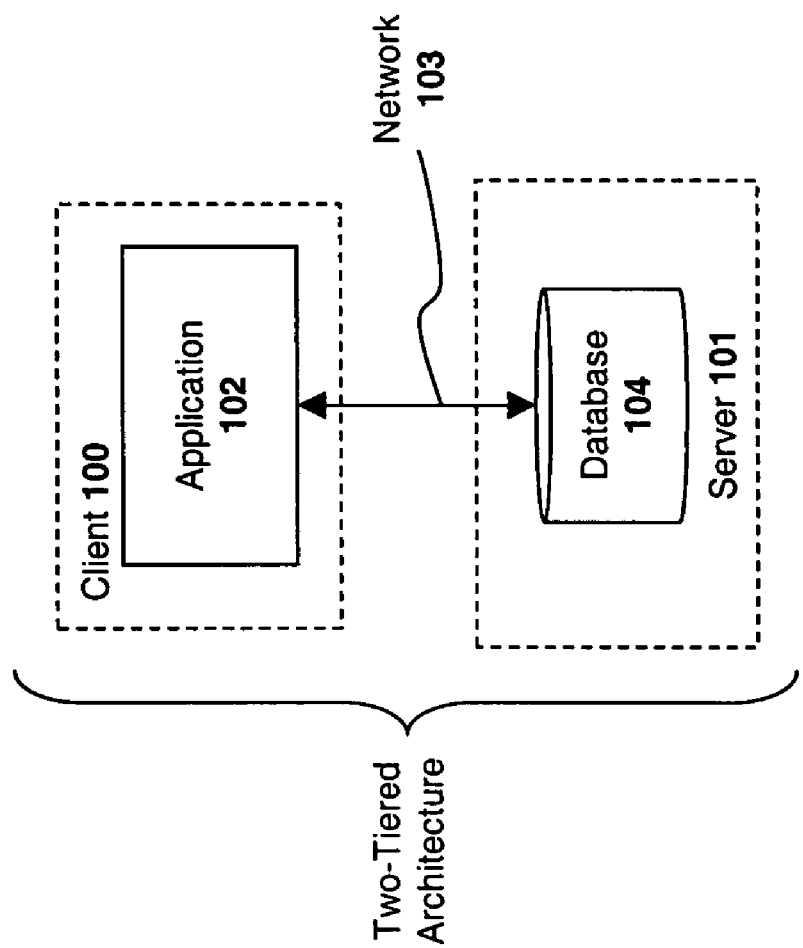
FIG. 1A is a block diagram illustrating a prior art two-tier client-server architecture.
Figure 1B:
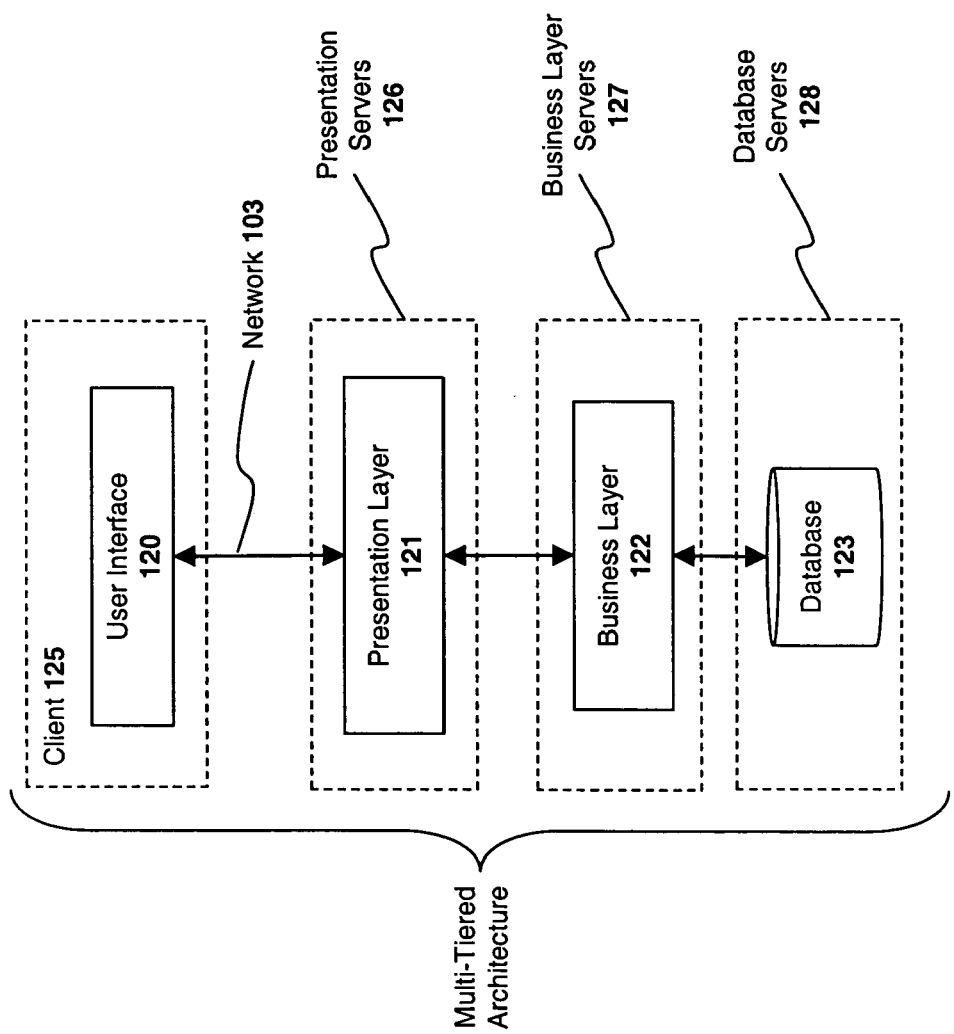
FIG. 1B is a block diagram illustrating a prior art multi-tier client-server architecture.
Figure 1C:
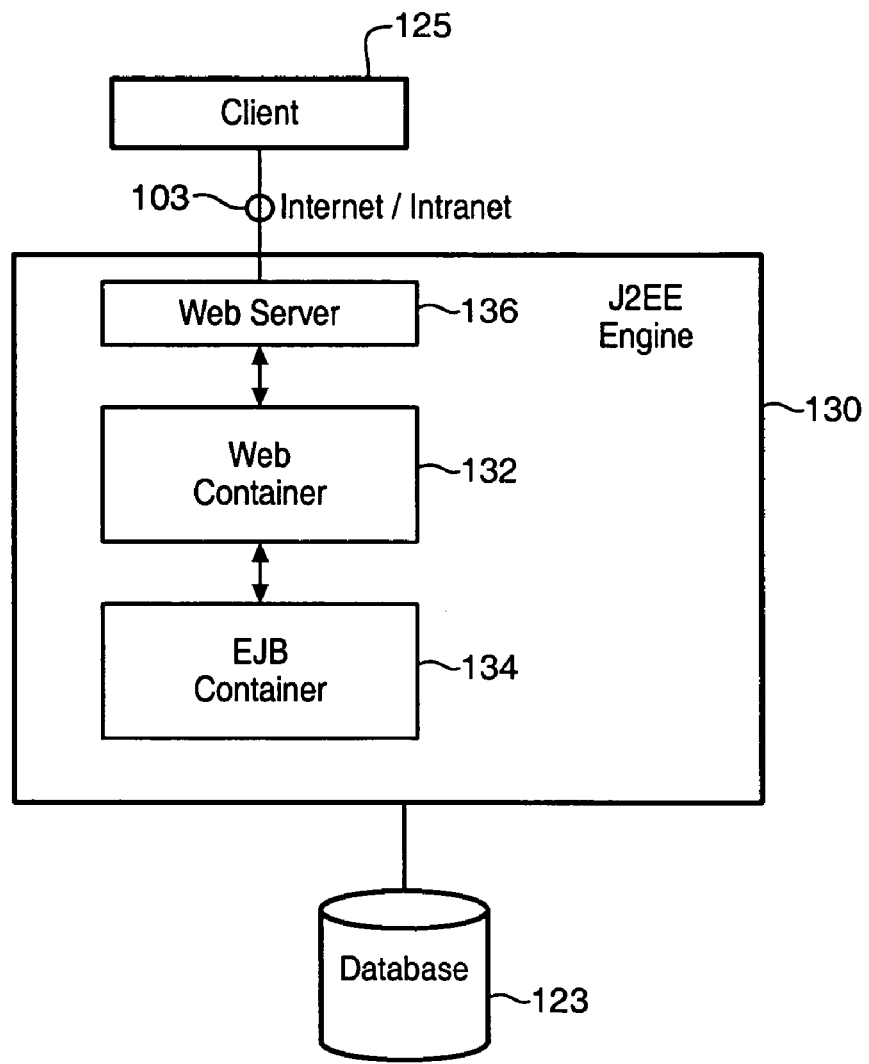
FIG. 1C is a block diagram illustrating a prior art J2EE environment.

Described below is a system and method for employing performing data processing using shared memory. Throughout the description, for the purposes of explanation, numerous specific details are set forth in order to provide a thorough understanding of the embodiments of the present invention. It will be apparent, however, to one skilled in the art that the present invention may be practiced without some of these specific details. In other instances, well-known structures and devices are shown in block diagram form to avoid obscuring the underlying principles of the present invention.

In the following description, numerous specific details such as logic implementations, opcodes, resource partitioning, resource sharing, and resource duplication implementations, types and interrelationships of system components, and logic partitioning/integration choices may be set forth in order to provide a more thorough understanding of various embodiments of the present invention. It will be appreciated, however, to one skilled in the art that the embodiments of the present invention may be practiced without such specific details, based on the disclosure provided. In other instances, control structures, gate level circuits and full software instruction sequences have not been shown in detail in order not to obscure the invention. Those of ordinary skill in the art, with the included descriptions, will be able to implement appropriate functionality without undue experimentation.

Various embodiments of the present invention will be described below. The various embodiments may be performed by hardware components or may be embodied in machine-executable instructions, which may be used to cause a general-purpose or special-purpose processor or a machine or logic circuits programmed with the instructions to perform the various embodiments. Alternatively, the various embodiments may be performed by a combination of hardware and software.

Various embodiments of the present invention may be provided as a computer program product, which may include a machine-readable medium having stored thereon instructions, which may be used to program a computer (or other electronic devices) to perform a process according to various embodiments of the present invention. A machine-readable storage medium includes, but is not limited to, floppy diskette, optical disk, compact disk-read-only memory (CD-ROM), magneto-optical disk, read-only memory (ROM), random access memory (RAM), erasable programmable read-only memory (EPROM), electrically erasable programmable read-only memory (EEPROM), flash memory, or another type of media/machine-readable storage medium suitable for storing electronic instructions. Moreover, various embodiments of the present invention may also be downloaded as a computer program product, wherein the program may be transferred from a remote computer to a requesting computer by way of data signals embodied in a carrier wave or other propagation medium via a communication link (e.g., a modem or network connection).

Figure 2:
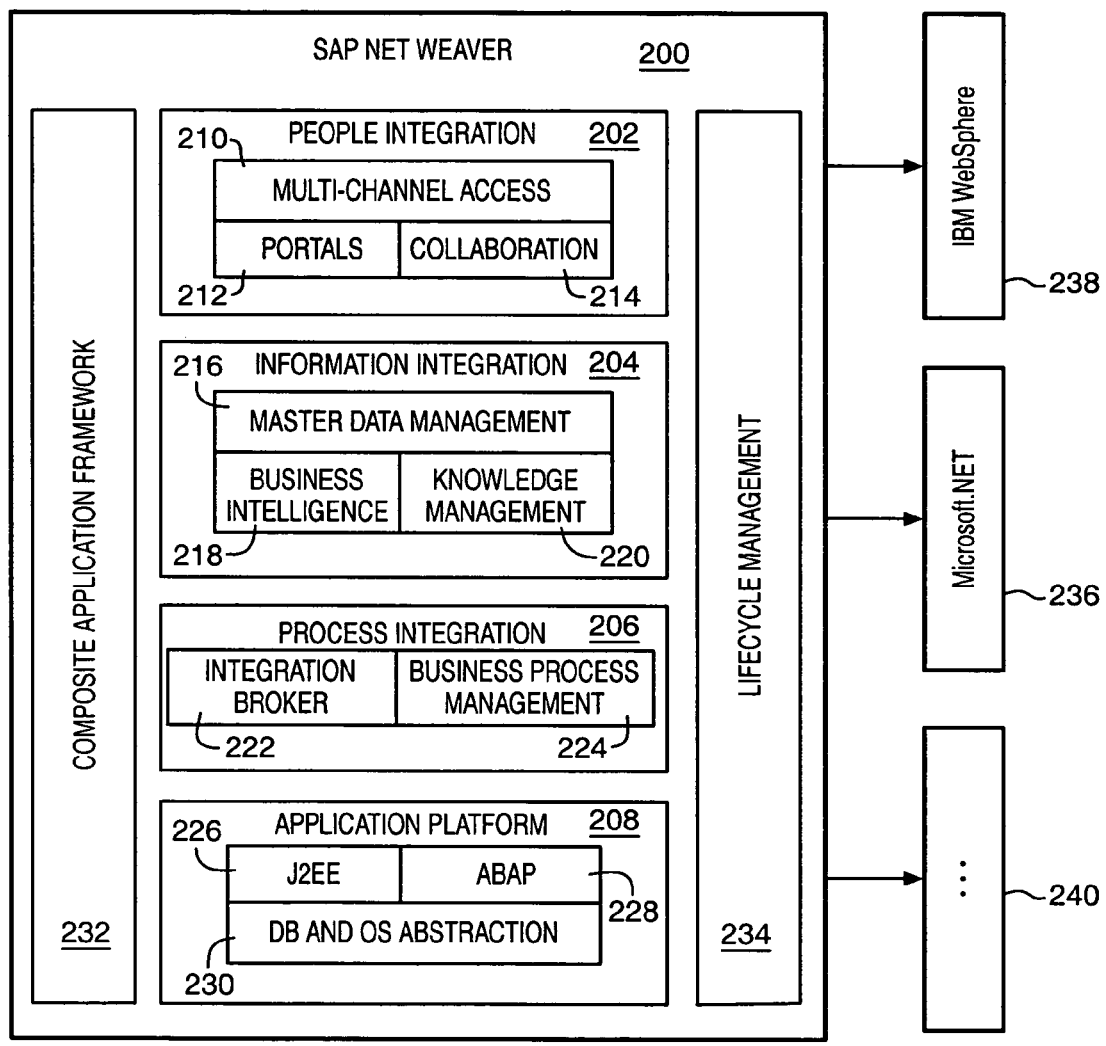
FIG. 2 is a block diagram illustrating an embodiment of the core components of SAP NetWeaver architecture.

FIG. 2 is a block diagram illustrating an embodiment of the core components of SAP NetWeaver architecture 200. As illustrated, the architecture 200 comprises various SAP platforms that are merged together to provide the integration of people, information, and processes in one solution. From an organizational point of view, the architecture 200 includes the following four core areas: people integration 202, information integration 204, process integration 206, and application platform 208. People integration 202 is performed using a portal solution 212 and a platform to work in collaboration 214. Users are provided a multi-channel access 210 to ensure mobility. Examples of the portal solution 212 include SAP Enterprise Portal, SAP Mobile Engine, and Collaboration Package for SAP Enterprise Portal.

Information integration 204 refers to converting information into knowledge quickly and efficiently. Information integration 204 provides efficient business intelligence 216 and knowledge management 220 using SAP products like Business Information Warehouse (BW) and Knowledge Management (KM). Further, consolidation of master data management 218 beyond system boundaries is performed using SAP's Master Data Management (MDM). Process integration 206 refers to optimized process management using integration broker or SAP exchange infrastructure 222 and business process management 224 techniques. Examples of products to perform process integration 206 include Exchange Infrastructure (XI) and Business Process Management (BPM).

Application platform 208 refers to SAP's Web Application Server (Web AS), which is the basis for SAP applications. Web AS, which may be independent of the database and operating system 230, includes a J2EE engine 226 in combination with an already present ABAP engine 228 to further enhance the application platform 208. The architecture 200 further includes a composite application framework 232 to provide various open interfaces (APIs) and a lifecycle management 234, which is an extension of the previous Transport Management System (TMS). As illustrated, the architecture 200 further provides communication with Microsoft .NET 236, International Business Machine® (IBM) WebSphere™ 238, and the like 240.

Figure 3:
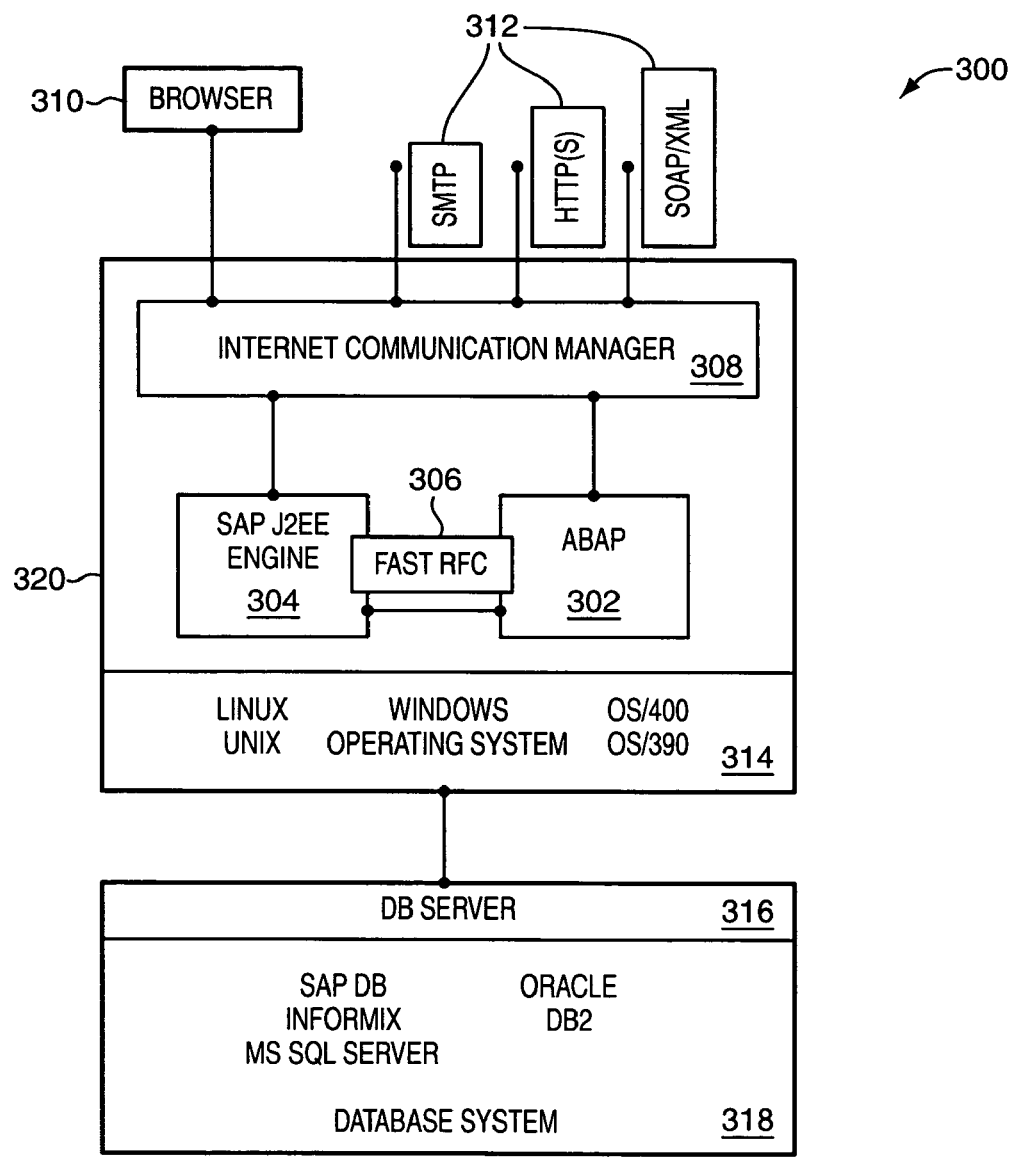
FIG. 3 is a block diagram illustrating an embodiment of an architecture having a Web Application Server.

FIG. 3 is a block diagram illustrating an embodiment of an architecture 300 having a Web Application Server 320. The architecture 300 serves as an application platform (e.g., application platform 208 of FIG. 2) for SAP NetWeaver and other SAP products. As illustrated, the architecture 300 includes a Web AS 320 having an ABAP engine 302, which provides the ABAP development and runtime environment, with the dependability, scalability, and inter-process independence of operating systems 314 and database systems 318. The operating system 314 includes LINUX, UNIX, Windows, OS/390, OS/400, and the like. The database system 318 is based on a database server 316, such as SAP database (SAP DB), Informix, Oracle, DB2, Microsoft Sequential query Language (MS SgL) server, and the like.

The Web AS 320 having the ABAP engine 302 is further enhanced by including a J2EE engine 304. The J2EE engine 304 is in communication with the ABAP engine 302 via a fast Remote Function Call (RFC) connection 306. The two engines 302-304 are further in communication with an Internet Communication Manger (ICM) 308. The ICM 308 is provided for handling and distributing queries (e.g., Internet queries) to various individual components of the architecture 300. The architecture 300 further supports a browser 310, such as Microsoft Internet Explorer, Netscape Navigator, and other modified variations of mobile end devices, such as personal digital assistants (PDAs), pocket computers, smart cell phones, other hybrid devices, and the like. The Web AS 320 also supports various protocols and standards 312, such as HyperText Markup Language (HTML), eXtensible Markup Language (XML), Wireless Markup Language (WML), HyperText Transport Protocol (HTTP(S)), Simple Mail Transfer Protocol (SMTP), Web Distributed Authority and Versioning (WebDAV), Simple Object Access Protocol (SOAP), Single Sign-On (SSO), Secure Sockets Layer (SSL), X.509, Unicode, and the like.

Figure 4:
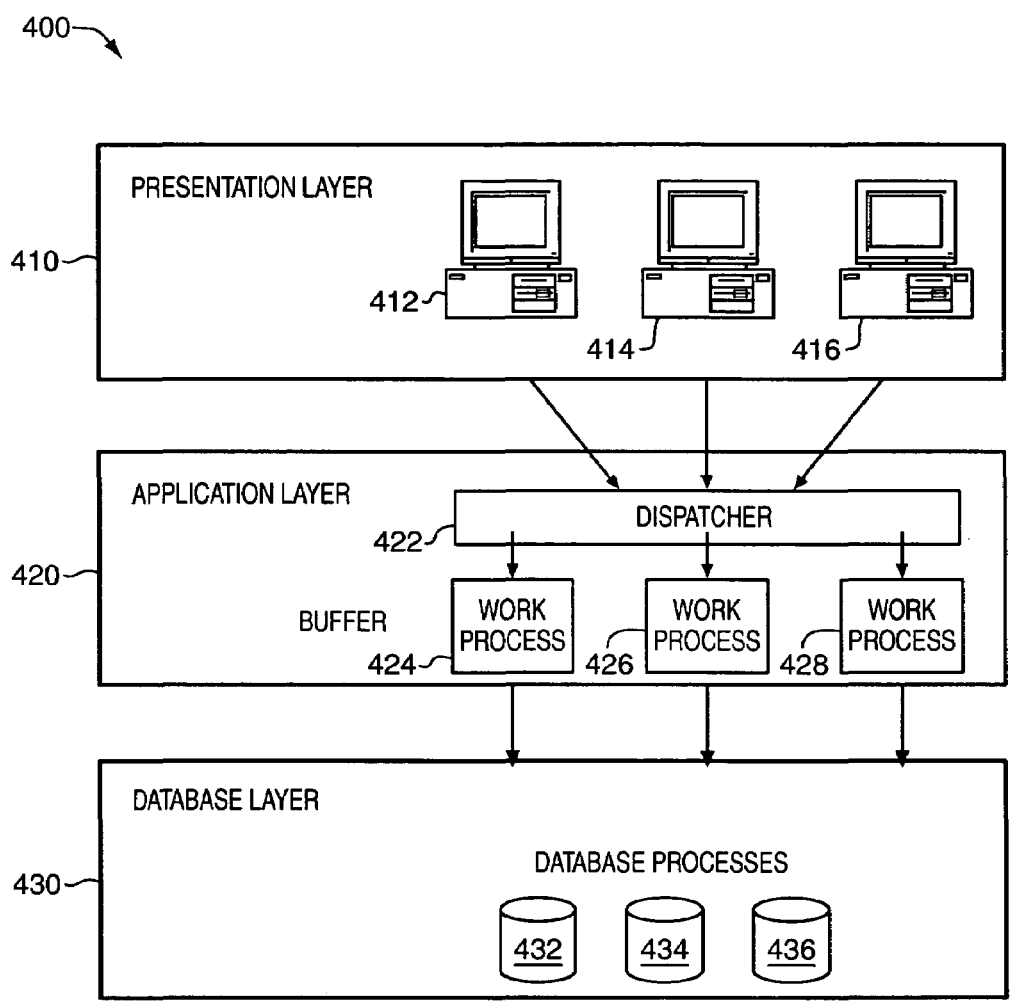
FIG. 4 is a block diagram illustrating an embodiment of a Web Application Server-based architecture having multiple layers.

FIG. 4 is a block diagram illustrating an embodiment of a Web Application Server-based architecture 400 having multiple layers 410, 420, 430. As illustrated, the three layers or levels 410, 420, 430 include a presentation layer (or distributed services or manager or user or client layer) 410, an application agent layer (or agent layer) 420, and a database layer (or instrumentation layer) 430. Various components and elements at each of layer 410, 420, 430 of the architecture 400 are, directly or indirectly, interconnected via a network (e.g., a Local Area Network (LAN)). Alternative embodiments of the architecture 400 may include more or fewer layers.

At the presentation layer 410, the clients are illustrated as workstations or terminals 412-416 that are used to collect and gather user input and send it to the application layer 420 via a network connection. The network connection may be a wired or wireless connection to a LAN, a Wide Area Network (WAN), a Metropolitan Area Network (MAN), an intranet, and/or the Internet. The terminals 412-416 include personal computers, notebook computers, personal digital assistants, telephones, and the like. In one embodiment in which the network connection connects to the Internet, one or more of the user terminals 412-416 may include a Web browser (e.g., Internet Explorer or Netscape Navigator) to interface with the Internet.

The presentation layer 410 allows the end user to interact with the relevant application using a GUI, such as the SAP GUI, which is a universal client widely used for accessing SAP R/3 or mySAP functions. The GUI works as a browser and offers easy access to various SAP functions, such as application transactions, reports, and system administration functions. The SAP GUI, for example, is available in three different formats, each of which having its own unique selling point and is suited to a particular user. The three formats include SAP GUI for Windows®, SAP GUI for HTML, and SAP GUI for Java™.

The presentation layer 410 may also includes various management applications, such as a Java Management Extension (JMX)-compliant management application, a JMX manager, and/or a proprietary management application. The management applications include one or more graphical management applications, such as a visual administrator, operating to, for example, retrieve and display information received from the application layer 420 and/or the database layer 430. The visual administrator includes a monitor viewer to display such and other information. The monitor viewer includes a GUI-based or Web-based monitor viewer. Management applications include third party tools, such as file systems, to store information.

The application layer 420 includes various application servers and computing devices to perform data processing. The application layer 420 includes a dispatcher 422, which refers to the central process on the application layer 420 for processing transactions. For example, the dispatcher 422 is used to distribute the request load to individual work processes 424-428, organize communication between the work processes 424-428, and handle connection to the presentation layer 410. For example, when a user makes processing entries from his computer using the menu on the presentation layer 410, the entries are converted into a special format (e.g., GUI protocol) and forwarded to the dispatcher 422. The dispatcher 422 then places this request in a dispatcher queue. The queue is then used to find free work processes 424-428 that carry out the processing. The application layer 420 may be implemented in accordance with J2EE v1.3, final release Sep. 24, 2001, published on Jul. 18, 2002 (the J2EE Standard). An update of J2EE v1.3 was recently released, on Nov. 24, 2003, as J2EE v1.4. The management techniques described herein are used to manage resources within a "cluster" of server nodes. An exemplary cluster architecture is described below with respect to FIGS. 14-15. However, the underlying principles of the invention are not limited to any particular application server architecture.

The database layer 430 is used to optimize the data access without being dependent on the underlying database and the operating system. The database independence is achieved using open standards, such as Open SgL and Java Database Connectivity (JDC). The presentation layer 410 is where the user interacts with the relevant application, which is then executed at the application layer 420, while the data persistence 432-436 is managed at the database layer 430. The database layer 430 may include one or more database management systems (DBMS) and data sources. Furthermore, the database layer 430 is compatible with both the ABAP and J2EE engines.

The database layer 430 may include one or more database servers, EJB servers, old systems, and mySAP components. The clients at the presentation layer 410 may access one or more of the applications via standalone Java programs and programs that help access an application via, for example, using Internet Inter-Object Request Broker Protocol (IIOP)/Common Object Request Broker Architecture (COBRA) written using any number of programming languages (e.g., –C, C, and C++).

The J2EE environment may also include various J2EE containers that are associated with various J2EE services and APIs, which include Java Naming Directory Interface (JNDI), Java Database Connectivity (JDBC), J2EE connector Architecture (JCA), Remote Invocation (RMI), Java Transaction API (JTA), Java Transaction Service (JTS), Java Message Service (JMS), Java Mail, Java Cryptography Architecture (JCA), Java Cryptography Extension (JCE), and Java Authentication and Authorization Service (JAAS). The J2EE services further include EJB_service, servlet_JSP, application_client_service, connector_service to provide (J2EE containers, namely) EJB containers, Web containers, application client containers, and connector containers, respectively.

Figure 5:
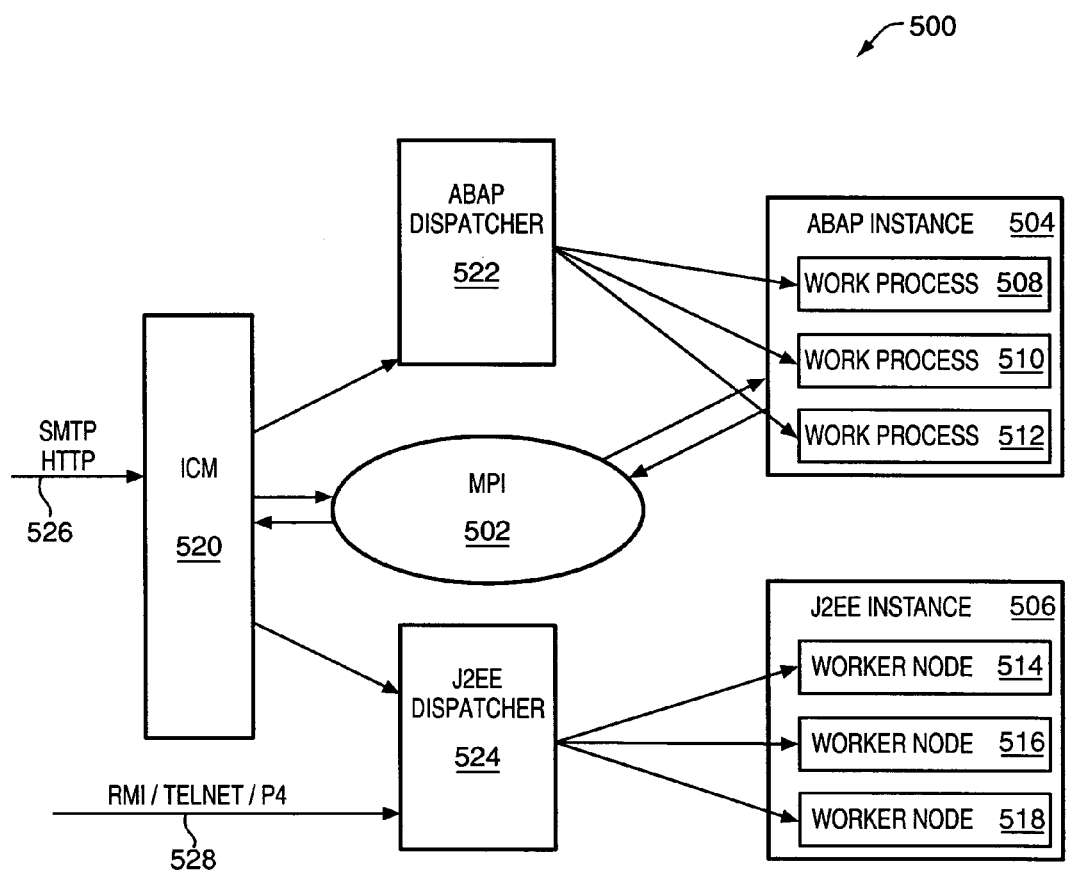
FIG. 5 is a block diagram illustrating a network-based communication architecture for performing data processing.

FIG. 5 is a block diagrams illustrating a network-based communication architecture 500 for performing data processing. Computers typically communicate with each other via one or more networks without the advantage of having common shared memory. In the illustrated network-based communication architecture 500, memory pipes 502 are provided for facilitating data processing of ABAP-related processes-based requests. Regarding Java-related processes-based requests, no common memory access is provided. Instead, local and individualized memory is assigned to each of the worker nodes 514-518 and other components of the J2EE instances 506. Furthermore, socket (not shown) are provided as interfaces that serve as a communication mechanism to act as endpoints for sending and receiving data between various processes 508-512 and nodes 514-518.

A process refers to a task being run by a computer, which is often executed simultaneously with several other tasks. Many of the processes exist simultaneously with each of them taking turns on the central processing unit (CPU). Typically, the processes include operating system (OS) processes that are embedded in the operating system. The processes consume CPU time as opposed to the memory that takes up space. This is typically the case for both the processes that are managed by the operating system and those processes that are defined by process calculi. The processes further include specialized processes, such as ABAP work processes 508-512 and J2EE worker nodes 514-518.

The operating system works to keep the processes separated and allocate the resources to help eliminate the potential interferences of the processes with each other when being executed simultaneously. Such potential interferences can cause system failures. Further, the operating system may also provide mechanisms for inter-process communication to enable processes to interact in safe and predictable manner. Typically, an OS process consists of memory (e.g., a region of virtual memory), which contains executable code or task-specific data, operating system resources that are allocated to each of the processes which include file descriptor (for UNIX) and handles (for Windows), security attributes (e.g., process owner and the set of permissions), and the processor state (e.g., content of registers, physical memory addresses), which is stored in the actual registers when the process is executing.

The ABAP work processes and the J2EE worker nodes which are OS processes 508-518 are considered specialized processes that contain the attributes and behavior of the typical OS process and are created, scheduled, and maintained by the operating system. For example, the ABAP work processes 508-512 are specialized in that they are used to execute the ABAP-based transactions, and the J2EE worker nodes 514-518 are specialized in that they are used to execute the Java-based transactions.

Having assigned individualized memory provides a relatively inefficient computing, which lacks robustness as the work processes 508-512 and worker nodes 514-518 do not communicate with each other and have to access the local memory for information or data. For example, the direct communication between the ABAP instance 504 and its ABAP work processes 508-512 and the J2EE instance 506 and its J2EE worker nodes 514-518 is lacking. Furthermore, such network-based communication using various network connections also causes the data processing transactions to be time-consuming, unreliable due to network errors, and less secure. For example, a typical data processing transaction may include retrieving of the data from one local memory, flowing of the data through various protocols (e.g., Transmission Control Protocol (TCP), User Datagram Protocol (UDP)), addresses (e.g., Internet Protocol (IP) address) and operating systems, before reaching its destination at another local memory.

Figure 6:
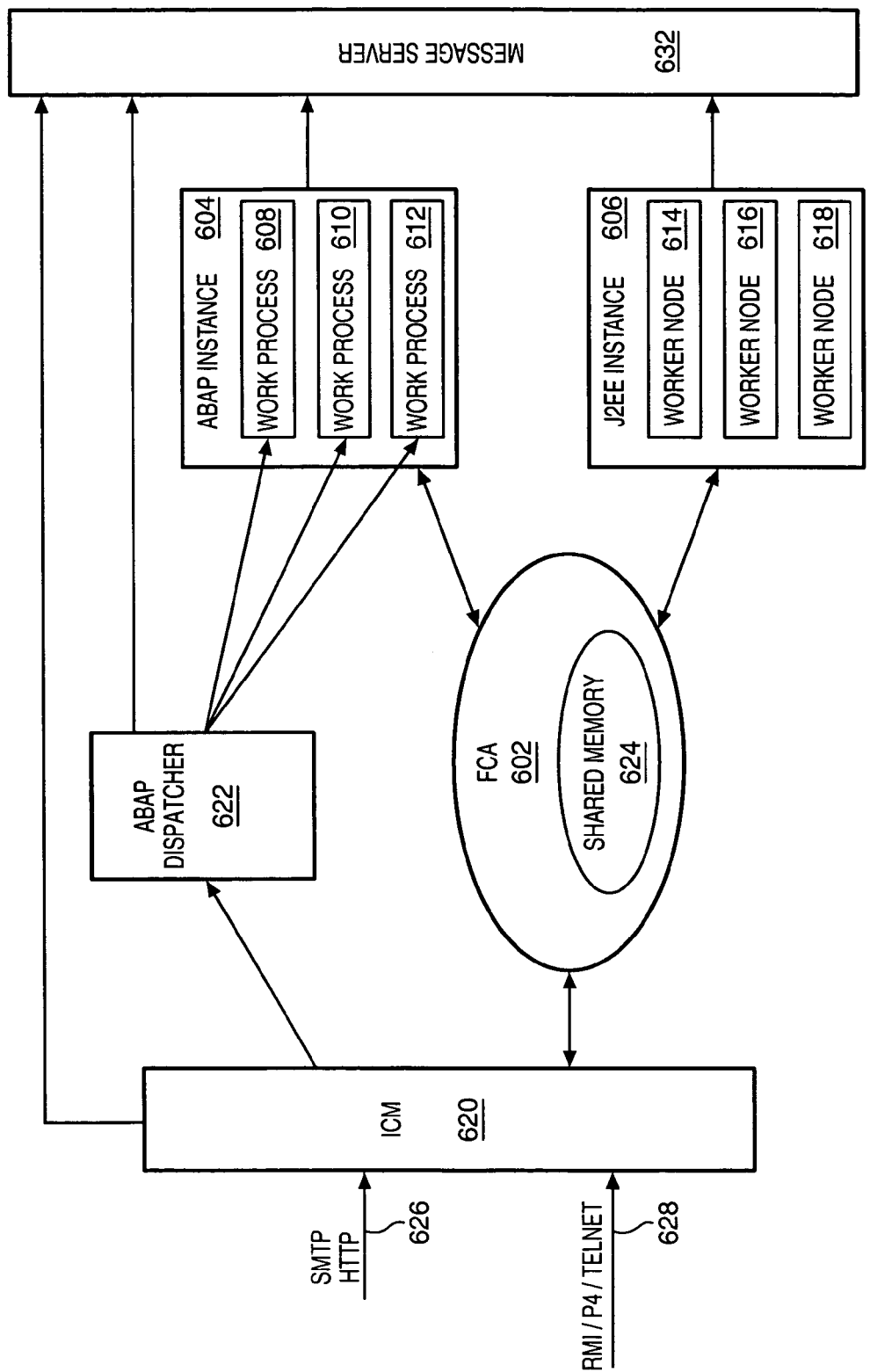
FIG. 6 is a block diagram illustrating an embodiment of a Web Application Server architecture having a Fast Channel Architecture including shared memory.

FIG. 6 is a block diagram illustrating an embodiment of a Web Application Server architecture (architecture) 600 having a Fast Channel Architecture (FCA) 602 including shared memory 624. It is to be noted that the FCA 602 here is shown in relation to SAP's Web AS architecture 600 and the ABAP and J2EE engines 604-606 which is to be regarded as an example for clarity and structure and not as a limitation. The FCA 602 is generic and versatile in nature and is not limited to the ABAP and J2EE engines 604-606 or SAP's Web AS architecture 600. The FCA 602 can be employed in and used with any number of client/server environments and application servers, such as Unix Application Server, Microsoft Windows Application Server, Oracle® Application Server, Java System Application Server, J2EE Application Server, and the like. Furthermore, it is contemplated that in terms of functionality, there may be an overlap between various application servers and Web servers. Examples of Web servers include Netscape Application Server, BEA Weblogic Enterprise, Borland AppServer, IBM's WebSphere Application Server, and the like. Stated differently, although SAP's Web AS architecture 600 is used as an example, the architecture 600 may refer to any number of application servers using the FCA 602 and is not limited to SAP's Web AS.

In one embodiment, the FCA 622 includes shared memory 624 to facilitate bi-directional communication between various independent processes that include OS processes and further include specialized processes, such as the ABAP work processes 608-612 and the J2EE worker nodes 614-618. The shared memory 624 at the FCA 602 provides a relatively fast, efficient, scalable, reliable, and secure communication between various work processes and worker nodes 608-618 on the same physical host. The shared memory-based bi-directional communication utilizes the centralized shared memory 624 for the work processes and worker nodes 608-618 and other components of the architecture 600 to share and access and thus, eliminating the need for having individualized local memory and for communicating via a network. Furthermore, the use of the shared memory 624 provides for a copy-free communication, high bandwidth, low latency, and fixed size communication buffers.

Typical OS processes refer to tasks embedded in the operating system. For example, each time a client initiates a program or a document (e.g., opening Microsoft Word®), a request is placed with the operating system regarding commencing the task of opening the document for the client. Several of such processes can be performed simultaneously in the CPU by taking turns. Typically, an operating system provides the isolation of such processes, so they are less likely to interfere with each other, such as when there is a crashed process, none of the other processes are affected by it and so the potential system failure is avoided. For example, the operating system can increase isolation and robustness by allocating one process for each user session, and running a VM for that user session within the allocated process. However, in some situations (e.g., when there are a large number of user sessions), such operating system scheduling and allocation can add to the system overhead and consume valuable resources, such as time and space.

The processes may contain some memory (e.g., a region of virtual memory for suspended processes which contains executable code or task-specific data), operating system resources that are allocated to such processes (such as file descriptors, when referring to UNIX, and handles, when referring to Windows), security attributes, such as process owner and the process' set of permissions, and the processor state, such as the content of registers, physical memory addresses, etc.

Various enterprise servers and other large servers are considered request processing engines for processing large numbers of small user requests associated with user sessions. The user requests lead to the creation of processes, which refer to processing of such user requests. The processing of the requests usually involves the running of a business code (e.g., Java servlets or EJBs) in a runtime system (e.g., a Java virtual machine (JVM)) executing on a server. In such a server, scalability can be achieved by using multiple threads, such as a multi-threaded VM, to process requests corresponding to a number of user sessions.

In one embodiment, the shared memory 624 can provide a common access and a buffer for the process-attachable VMs, the OS processes including ABAP work processes 608-612 and J2EE worker nodes 614-618, as well as the dispatcher processes. It is to be noted that the ABAP work processes 608-612 at the ABAP engine 604 are considered specialized processes that are used for processing the OS processes with specialized functionality. The work processes 608-612 have the attributes and behavior that are also common with the OS processes and they may be created, scheduled, and maintained by the operating system. For example, the ABAP work processes 608-612 are to execute ABAP transactions, while the J2EE worker nodes 614-618, also regarded as specialized processes having similar attributes as the OS processes, are to execute the Java code.

Having introduced the FCA 602 to the architecture 600 facilitates an executable program (e.g., a program running on an OS process executing the code) to use the FCA functionalities by binding the FCA library at the time of development and by calling the FCA-API in the programming language (e.g., C or Java). For example, at runtime, the executable program operates as a process in the operating system, such as when a program (e.g., MS Word or Excel) is started several times, which creates several OS processes associated with one program that are performed using the FCA functionalities. In one embodiment, the FCA 602 may remain independent of a particular programming language (e.g., ABAP or Java) or a particular operating system (e.g., UNIX or Windows). The FCA functionalities (e.g., ABAP statements, transactions, input/output processing, etc.) may be achieved by coding such functionalities in the program. Stated differently, the program, when running, is executed as an OS process and as such it performs various tasks, such as reading/writing data, processing data, and accessing the FCA functionalities.

Although not illustrated here, a dispatcher (e.g., ABAP dispatcher 622) could serve as a central process on the application layer for processing transactions. For example, the ABAP dispatcher 622 facilitates the starting of the ABAP work processes 608-612, monitoring of the status of the work processes 608-612, restarting a work process 608-612 in case of a crash, communicating with the GUI, dispatching requests to the ABAP work processes 608-612 based on the availability of such work processes 608-612, and communicating with the message server 632. In one embodiment, the dispatcher may use the FCA-based shared memory 624 to communicate with the work processes 608-612, but the FCA 602 alone may not necessarily replace the dispatcher 622. However, the functionalities of the dispatcher 622 may be moved to other components and processes, such as to the Internet Communication Manger (ICM) 620 to perform one or more of the dispatcher-related tasks. In one embodiment, this can be performed by providing a code in the program, which when running on an OS process, can execute the code. Also, on the ABAP instance 604, the dispatcher may still remain to provide communication with GUI, such as the SAP GUI.

On the J2EE instance 606, in one embodiment, the functionality of the J2EE dispatcher (not shown) may be moved to the ICM 620. The moving of the J2EE dispatcher functionalities to the ICM 620 provides increased robustness, scalability, and a simple architecture with a single access point. In another embodiment, it is not required that the J2EE dispatcher be removed when using the FCA-based architecture 600 and that the FCA 602 can also work with the J2EE dispatcher to perform various tasks. In an alternative embodiment, with regard to dispatching various requests, neither the ABAP dispatcher 622 nor the J2EE dispatcher may be needed, because the user requests can be serially assigned to the available ABAP work processes 608-612 and J2EE worker nodes 614-618. For example, each ABAP work process 608-612 could maintain a request queue for various requests at the shared memory 624 and attach the VM of the user session corresponding to the request at the front of the request queue to process the next request.

In one embodiment, having the shared memory 624 helps eliminate the necessity for local communication memory or individually dispersed memory for performing requests and for communicating data. Stated differently, the shared memory 624, as opposed to a local memory using a network connection, is used to create a buffer (e.g., for receiving and transmitting data) for the work processes 608-612 and the worker nodes 614-618. For example, once a request to perform a particular task is received at the server from a client/user session, a process to be performed is initiated as the request is created. A request queue is created at the shared memory 624 and the recently-created request is then placed in the request queue. In one embodiment, the dispatcher 622 then determines the availability of various work processes 608-612 and, based on such availability, assigns the request to the available work process 608-612 to handle. The work process 608-612 performs the corresponding OS process to satisfy the client request. The satisfying of the request may include performing the requested task and providing the requested information or response data back to the client via the shared memory 624. In another embodiment, if the dispatcher 622 is not used, the ICM 620 may possess the functionalities of the dispatcher 622 and assign the request to, for example, the available ABAP work process 608-612 or J2EE worker node 614-618. The ABAP-related requests are sent to the ABAP work processes 608-612 and the Java-related requests are sent to the J2EE worker nodes 614-618. Having the shared memory 624 provided by the FCA 602 not only allows a copy-free transmission of the data, but also eliminates the potential of the data being lost due to connection or network failures. Furthermore, using a single shared memory 624 allows the various tasks to run on a single local host, which in turn, provides a secure transmission of data. In one embodiment, the shared memory 624 includes memory pipes that are used bi-directionally and are created at startup along with initialization of the FCA 602.

In one embodiment, a block of the shared memory 624 may be set aside to generate request queues with each request queue having one or more requests to be performed. In one embodiment, the work processes 608-612 and worker nodes 614-618 may have direct access to this block of the shared memory 624 or a portion of the block may be mapped to the address space of the selected work processes 608-612 and worker nodes 614-618.

In one embodiment, the architecture 600 employs FCA handles (not shown) as communication end-points. The handles are regarded as an entity at the FCA 602 level for providing communication. Although the handles are not sockets, they act socket-like. For example, the handles are presented as sockets to the programmers and developers for their convenience and familiarity, but the architecture 600 has the benefits of employing the handles. Having the shared memory 624 reduces administrative costs, while increasing consistency and easing communication between various processes 602-606. Various entities at the shared memory 624 may include data, datagrams, application update information, strings, constants, variable, objects that are instances for a class, runtime representations of a class, and classloaders that are used to load class runtime representatives.

In the illustrated embodiment, the FCA 602 provides an FCA-based shared memory 624 in communication with an ICM 620, an ABAP instance 604, and a J2EE instance 606. The ABAP instance 604 includes various specialized work processes 608-612 that are, based on their availability, assigned various ABAP-based OS processes/client requests to perform. The architecture 600 further includes the J2EE instance 606, which includes server nodes or worker nodes 614-618 to complement the ABAP work processes 608-612 to perform various Java-based tasks (e.g., performing client requests/OS processes) that are assigned to them. In one embodiment, the J2EE instance 606 may include Java Virtual Machines (JVMs), while the ABAP instance 604 may include ABAP language VMs (ABAPVMs). The ABAP is a programming language for developing applications for the SAP R/3 system, which is a widely installed business application system developed by SAP AG. The Common Language Runtime (CLR) VMs may communicate with ABAP instance using FCA. The CLR is a managed code execution environment developed by Microsoft Corp. of Redmond, Wash.

The shared memory 624 includes memory pipes, which are used bi-directionally, to provide bi-directional communication between various components of the architecture 600 that include the ABAP instance 604 and the J2EE instance 606 and their work processes 608-612 and worker nodes 614-618, respectively, the ICM 620, and other third-party applications. In one embodiment, having the shared memory 624 eliminates the necessity for the J2EE instance 606 to communicate with the ICM 620, and ultimately the client, via the TCP/IP connection. Instead, the J2EE instance 606 and the ABAP instance 604 are integrated such that both instances 604-606 are in communication with the ICM 620 via the shared memory 624. Further, the J2EE instance 606 is no longer required to have a dispatcher (e.g., dispatcher 524 of FIG. 5) to dispatch client requests to various J2EE-based worker nodes 614-618. In one embodiment, the dispatcher-related tasks may be performed at the ICM 620 and, in another embodiment, the J2EE dispatcher may still be maintained and used in communication with the J2EE instance 606.

In one embodiment, the FCA 602 is used to provide an integration point for the ABAP and J2EE instances 604-606, which allows the J2EE worker nodes 614-618 and the ABAP work processes 608-612 to have access to the same centralized shared memory 624. Stated differently, not only the ABAP instance 604 and its work processes 608-612 having access to the FCA-based shared memory 624, but also the J2EE instance 606 and its worker nodes 614-618 have access to the same shared memory 624, which allows for direct bi-directional communication between various components of the architecture 600, including the work processes 608-612 and the worker nodes 614-618. Having access to the common shared memory 624 eliminates the need for associating individualized local communication memory for each of the work processes 608-612 and worker nodes 614-618 and the need for distributing the memory to various components of the architecture 600. Furthermore, the FCA-based shared memory 624 provides a common or centralized memory for each of the components to access, which eliminates the need for individualized/localized cache use for communicating entities (e.g., placing requests, updating data, retrieving responses) between components.

In one embodiment, the FCA 602 is used to provide a common API to facilitate the common access to the shared memory 624 and to provide direct bi-directional communication between various components of the architecture 600. In one embodiment, the shared memory 624 includes memory pipes that are used in a bi-directional fashion to facilitate the bi-directional communication between, for example, the ICM 620 and the ABAP and J2EE instances 604-606. The use of the shared memory 624 results in a cost-effective, efficient, fast, robust, and copy-free communication of entities between various components of the architecture 600. Using the shared memory 624 also allows for the integration of the J2EE instance 606 and the ICM 620 by providing direct and bi-directional communication between the two. For instance, the communication data is transported via the shared memory 624 and only local load-balancing is necessitated and further, protocols, such as RMI, P4, and Telnet, are ported through the ICM 620. Other protocols, such as SMTP, HTTP HTTPS, NNTP, FastCGI, remain ported through the ICM 620.

In one embodiment, the ICM 620 is used to facilitate communication between the architecture 600 and the clients by providing a browser or browser-like access to the user. The Internet protocols supported by the ICM 620 are provided as plug-ins for other standard protocols (e.g., HTTP, SMTP). For example, in a server role, the ICM 620 processes requests from the Internet that are received from the client via a Uniform Resource Locator (URL) with the server/port combination that the ICM 620 listens. The ICM 620 then invokes the local handler responsible for processing these requests, based on the URL. Applications (e.g., Business Server Page (BSP)) needing an ABAP context are transferred to the ABAP work processes 608-612, while Java requests are transferred to the J2EE instance 606 to be processed by the J2EE worker nodes 614-618. In one embodiment, the transfer of the requests between the ICM 620 and the ABAP instance 604 is conducted via the ABAP dispatcher 622, which also serves as a load balancer and a point for providing connection to a GUI. On the J2EE side 606, the dispatcher may not be present or necessitated.

The ICM 620 may include a central request queue for requests that are processed on worker threads. Various time-consuming operations (e.g., accept, SSL handshake, read, write, handshake, and close) are triggered through a request in the ICM request queue, which may not be protocol-specific. The queues in the shared memory 624 include request queues for each of the work processes 608-612 and the worker nodes 614-618. The number of entries in the request queues at the shared memory 624 provides an indication of the load situation of the server. The queues in shared memory 624 may also include other relevant information, such as information to help with FCA gueue Monitoring (FgM). The values may include the name of the queue (set at startup), current number of requests in the queue (set by a dedicated process), peak number of requests (maintained by FCA), maximum number of requests (fixed value that can be set at startup), last insert (maintained by FCA), and last remove (maintained by FCA).

Figure 7:
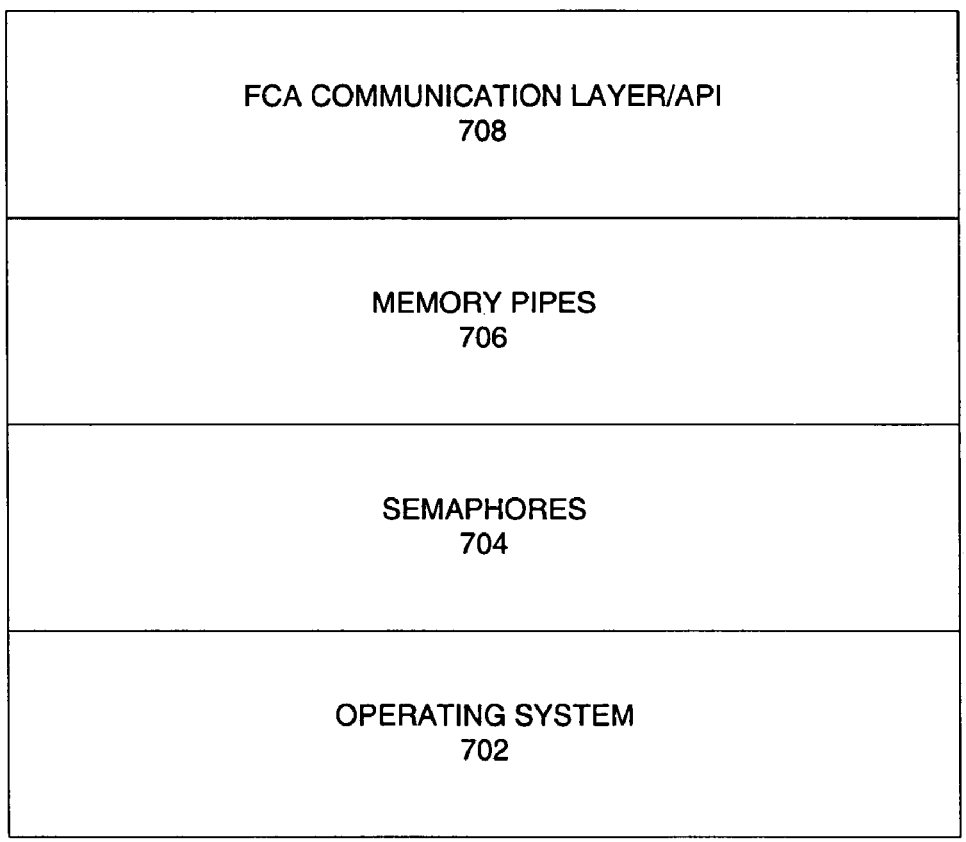
FIG. 7 is a block diagram illustrating an embodiment of the layering of the Fast Channel Architecture.

FIG. 7 is a block diagram illustrating an embodiment of the layering of the Fast Channel Architecture (FCA or architecture) 700. The architecture 700 is provided to make data processing more efficient and effective by facilitate the enhancement and optimization of communication between various components of the Web AS, particularly the ABAP and J2EE engines (as detailed with reference FIG. 6). By providing direct and bi-directional communication between the ABAP and J2EE engines and their work processes and worker nodes, respectively, a level of tight, optimized, and fast coupling of the components is achieved using a single application server. Furthermore, the direct and bi-directional communication between the ICM and the J2EE engine is also achieved, which in turn, provides a better communication with external partners (e.g., clients) when receiving incoming requests and transmitting outgoing responses.

In one embodiment, these improvements are achieved by providing a common access to a commonly shared memory using memory pipes 706 and other necessary layers 702-704 and 708 of the architecture 700. Such use of the shared memory using the memory pipes 706 also provides secure and copy-free transfer of data, and decreased network overhead, latency, copy operations, and process switches. Further, to integrate the J2EE engine and the ICM, as illustrated in FIG. 6, various protocols, such as RMI, P4, and Telnet, are ported through the ICM, while the shared memory is used as a common access point to transport and communicate data.

In the illustrated embodiment, the architecture 700 includes a layer of operating system 702. The operating system 702 refers to the master control program that runs the computer. The first program is loaded when the computer is turned on, its main part, the kernel, resides in memory at all times. The operating system 702 sets the standards for all application programs that run on the computer. Further, the applications communicate with the operating system 702 for user interface and file management operations. Some examples of the operating system 702 include Windows (e.g., 95, 98, 2000, NT, ME, and XP), Unix (e.g., Solaris and Linux), Macintosh OS, IBM mainframe OS/390, and AS/400's OS/400. Disk Operating System (DOS) is still used for some applications, and there are other special-purpose operating systems as well.

In one embodiment, the semaphores 704 occupy another layer of the architecture 700. The semaphores 704 refer to the shared space for interprocess communications (IPC) controlled by "wake up" and "sleep" commands. For example, the source process fills a queue and goes to sleep until the destination process uses the data and tells the source process to wake up. The semaphores 704 are provided to work together with the memory pipes 706, which occupy another layer of the architecture 700, to facilitate the shared memory. The memory pipes 706 refer to a fast memory based unidirectional communication using pipes that are to transport communication data between various components of the architecture 700.

Using the architecture 700, these memory pipes 706 are utilized bi-directionally at the shared memory to relatively efficiently and quickly transport data between various components. The communication between processes and components is facilitated and further enhanced by the FCA communication layer 708, which include a communication interface or API. The communication layer 708 works with the semaphores 704 and the memory pipes 706 to facilitate direct and bi-directional communication between processes and components and to keep the communication efficient, secure, and fast. Further, the communication layer 708 works as an API to external inputs, third-party applications, and clients.

In addition to the layers 702-708 described, the FCA 700 may also includes another interface layer (not shown) to provide socket-like interface for ease. For example, a Java layer (e.g., jFCA) may be used to provide Java-based communication for external applications. This is also for programmers and developers who use Java to make use of the architecture 700. Also, for example, the FCA 700 employs handles as communication endpoints, but they are communicated to the programmers as sockets, which are well-known but are not as efficient as handles, by providing the Java interface layer. Similarly, the FCA 700 provides other interface layers, such as a C layer, to provide another interface to external applications and to facilitate an easier way to use the shared memory when programming in C.

Figure 8:
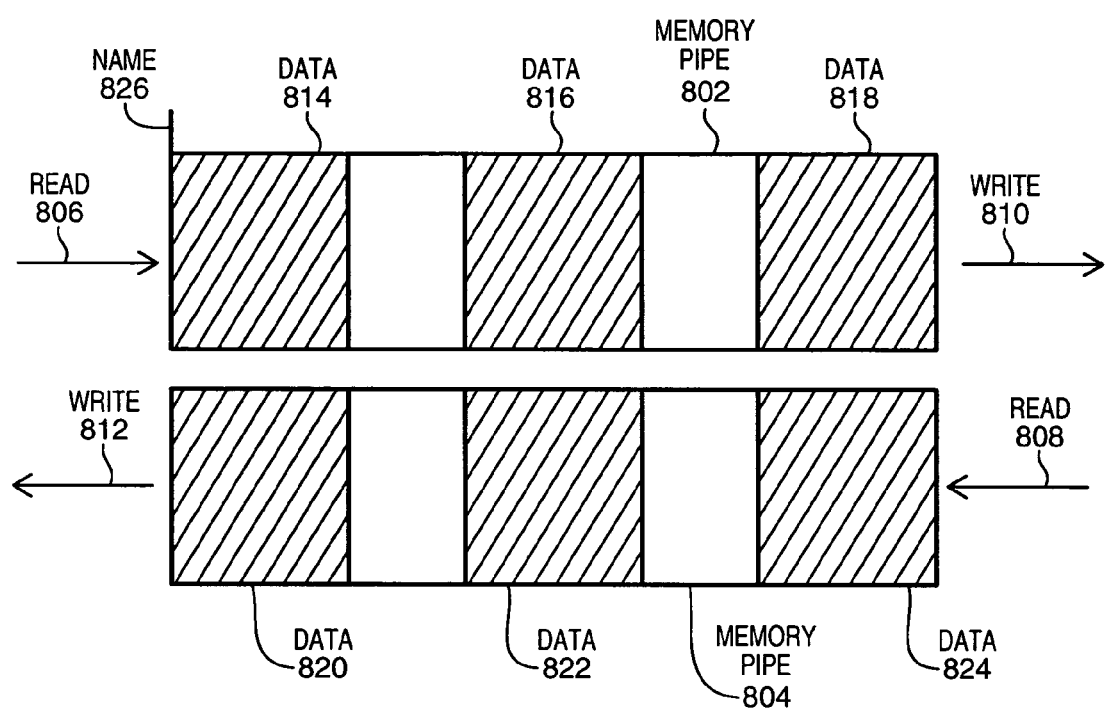
FIG. 8 is a block diagram illustrating an embodiment of a shared memory having memory pipes.

FIG. 8 is a block diagram illustrating an embodiment of a shared memory 800 having memory pipes 802-804. In the illustrated embodiment, the memory pipes 802-804 provide a secure and bi-directional fast memory based communication between various processes and components of the Web AS. The memory pipes 802-804 allow the shared memory 800 to be used for a common access between the server and the client for receiving requests, placing requests, and sending response data in response to the requests.

Each memory pipe 802-804 has two opening a read opening 806-808 and a write opening 810-812. The read opening 806-808 is from where the data 814-824 enters the memory pipe 802-804 to be sent. The write opening 810-812 is from where the data 814-824 exits the memory pipe 802-804 to be received. For example, data 814 enters the memory pipe 802 with a name 826. The name 826 represents metadata that is associated with and corresponds to the data 814 for, for example, identification, categorization, and the like. This data 814 is placed in the queue along with data 816 and data 818. The memory pipes 802-804 work in accordance with the well-known First-In-First-Out (FIFO) technique and so data 814 is placed behind data 816 and 818. On the other side, data 818 is the first one to exit or written 810, followed by data 816 and finally, data 814. Memory pipe 804 also work in the same way as the memory pipe 802. It is contemplated that the shared memory 800 may contain any number of memory pipes in addition to the two illustrated.

Although the memory pipes 802-804 appear one-directional in nature, using the FCA (e.g., the FCA communication layer), the memory pipes 802-804 are combined and placed in such order, as illustrated, that they facilitate bi-directional communication. Using the memory pipes 802-804 for bi-directional communication allows the shared memory 800 to be accessible by various components and processes and thus, providing direct and bi-directional communication between such components and processes. The shared memory 800 helps avoid network-like insecure communication and instead, provides a common shared memory-based secure communication.

The memory pipes 802-804 may need several buffers to perform a copy-free bi-directional communication of receiving requests and providing response to such requests. For example, the write side 810 may pre-allocate sufficient memory buffer before the read side 806 input the data 814 into the memory pipe 802. Several FCA buffer API functions are called to accomplish the buffer-related tasks at the memory pipes 802-804. In one embodiment, on the read side 806-808 of the memory pipes 802-804, reading data from the FCA connection object, which references buffer in the shared memory 800 of type FCA_BUF_HDL, is performed by calling <FcaGetInbuf>. With the function call <FCAGetInbuf>, access to the shared memory or memory pipe buffer is obtained from the server. The buffer is removed form the FCA input queue.

By calling <FcaPeekInbuf>, access to the buffer is received from the server, but the buffer is not removed from the input queue. With the function call <FcaGetOutbuf>, a new buffer is received to send to a communication partner. In one embodiment, the maximum usable size of the buffer may be fixed and thus, no size may need to be specified as parameter. Also, the buffer can now be released again with <FcaFreeBuf> or send to the communication partner with <FcaFlushOutbuf>. In one embodiment, the attributes (e.g., size_used and status) of the buffer may be set and there no further operations may be allowed on this buffer once this function is called. Finally, the buffer can be freed with the function call <FcaFreeBuf>, which may include either allocating the buffer with <FcaGetOutbuf> or receiving the buffer with <FcaGetInbuf>. No further operations with this buffer may be allowed.

Figure 9:
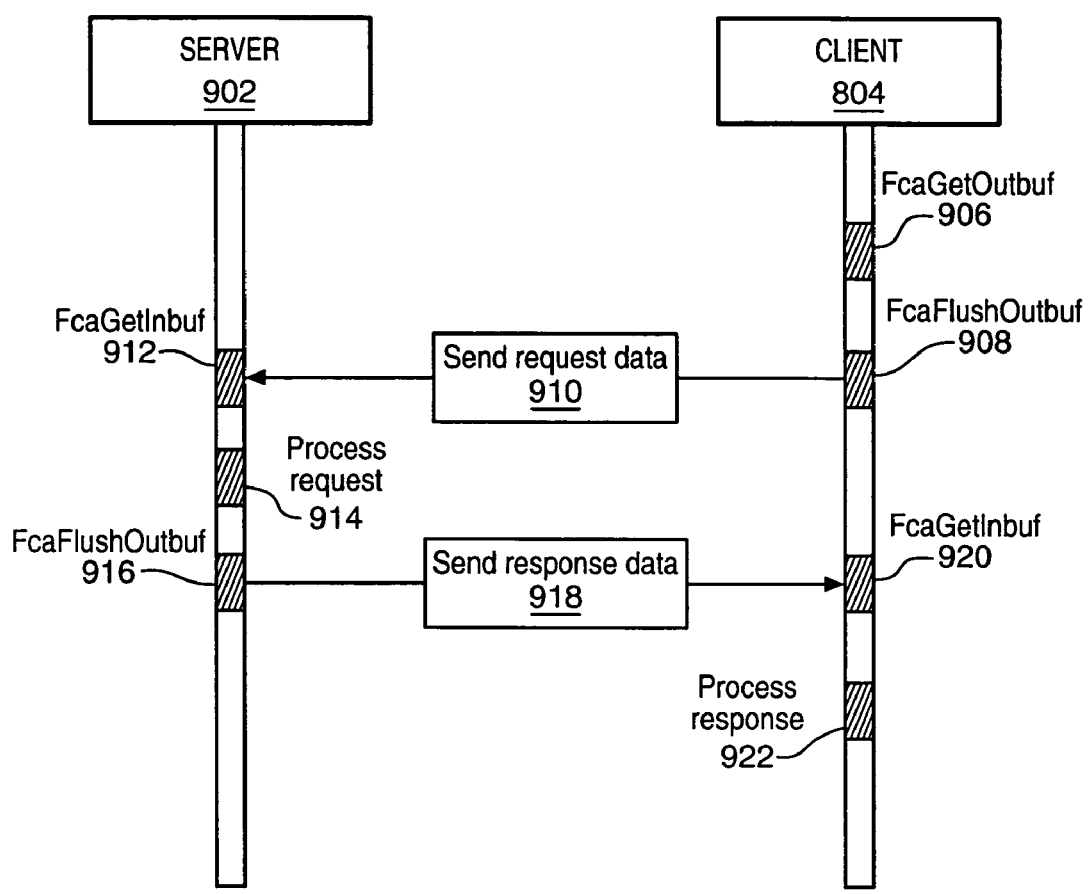
FIG. 9 is a diagram illustrating an embodiment of a transactional sequence of buffer calls between a client and a server using a shared memory.

FIG. 9 is a diagram illustrating an embodiment of a transactional sequence of buffer calls between a client 904 and a server 902 using a shared memory. At client 902, <FcaGetOutbuf> is called 906 to get buffer for request. Then, <FcaFlushOutbuf> is called 908 which results in flushing or sending a request 910 to the server 902. With <FcaGetInbuf> 912, the server receives the request buffer. The request is then processed 914. With <FcaFlushGetbuf> 916, output buffer is flushed to the client, which includes sending the response data 918 to the client. With the function call of <FcaGetInbuf> 920, the response buffer is received at the client 904. The response is then processed 922 at the client 904.

Figure 10:
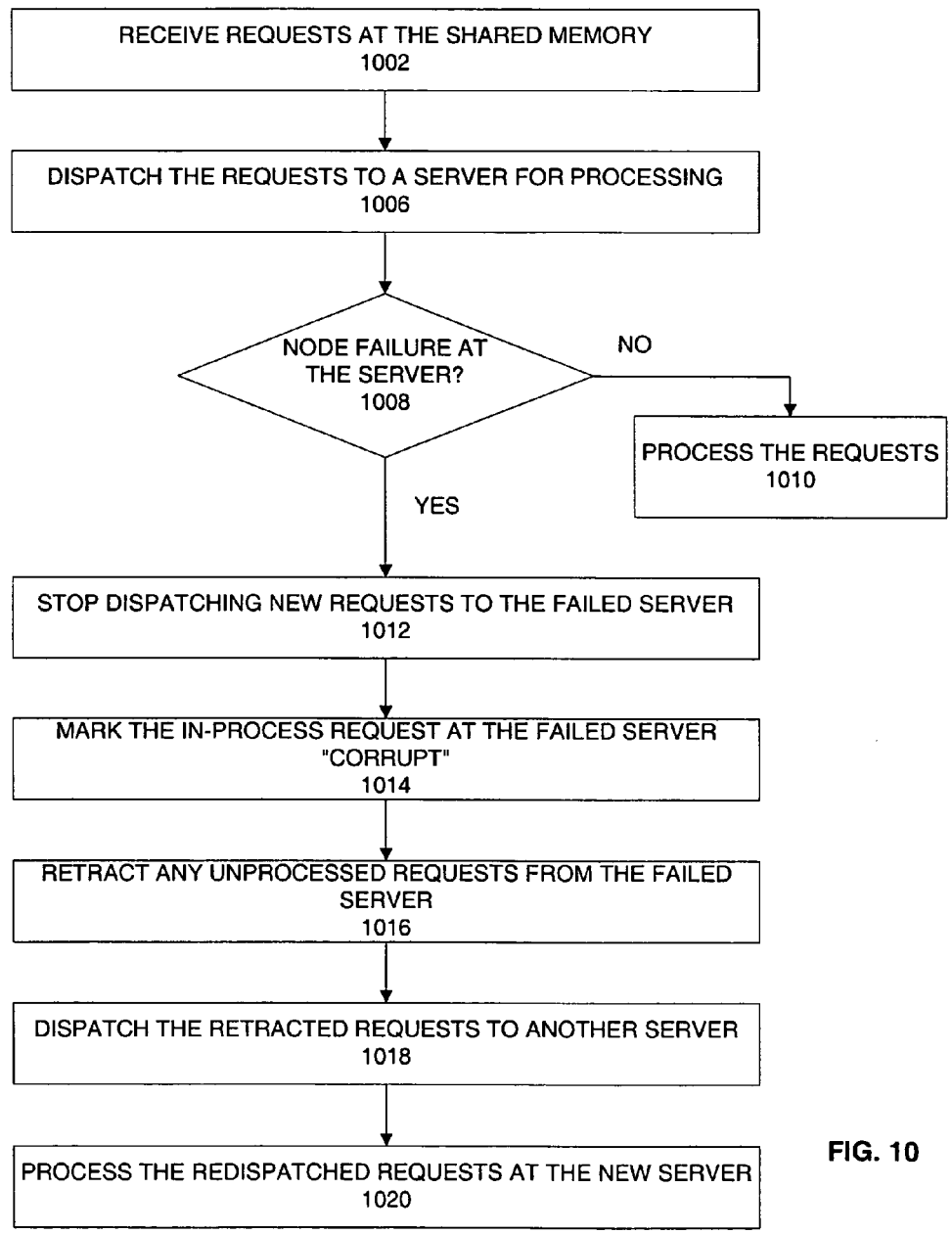
FIG. 10 is a flow diagram illustrating an embodiment of a process for handling requests.

FIG. 10 is a flow diagram illustrating an embodiment of a process for handling requests. At processing block 1002, requests are received at the shared memory from the client. The request is dispatched to a server for processing at processing block 1006. At decision block 1008, a determination is made as to whether there is a node failure at the server. If not, the process continues with processing of the requests 1010. If yes, the requests are no longer dispatched to that server at processing block 1012. The request in-process at the time the server crashed is marked corrupted at processing block 1014. For example, if nine requests were assigned to the server for processing and the crashed occurred when request 6 is being processed, request 6 is marked corrupted.

At processing block 1016, the remaining unprocessed requests are retracted from the crashed server. For example, unprocessed requests 7-9 are retracted. At processing block 1018, the retracted requests are then load balanced and dispatched to another server of the cluster of servers. The retracted and re-dispatched requests are processed at the new server at processing block 1020.

Figure 11:
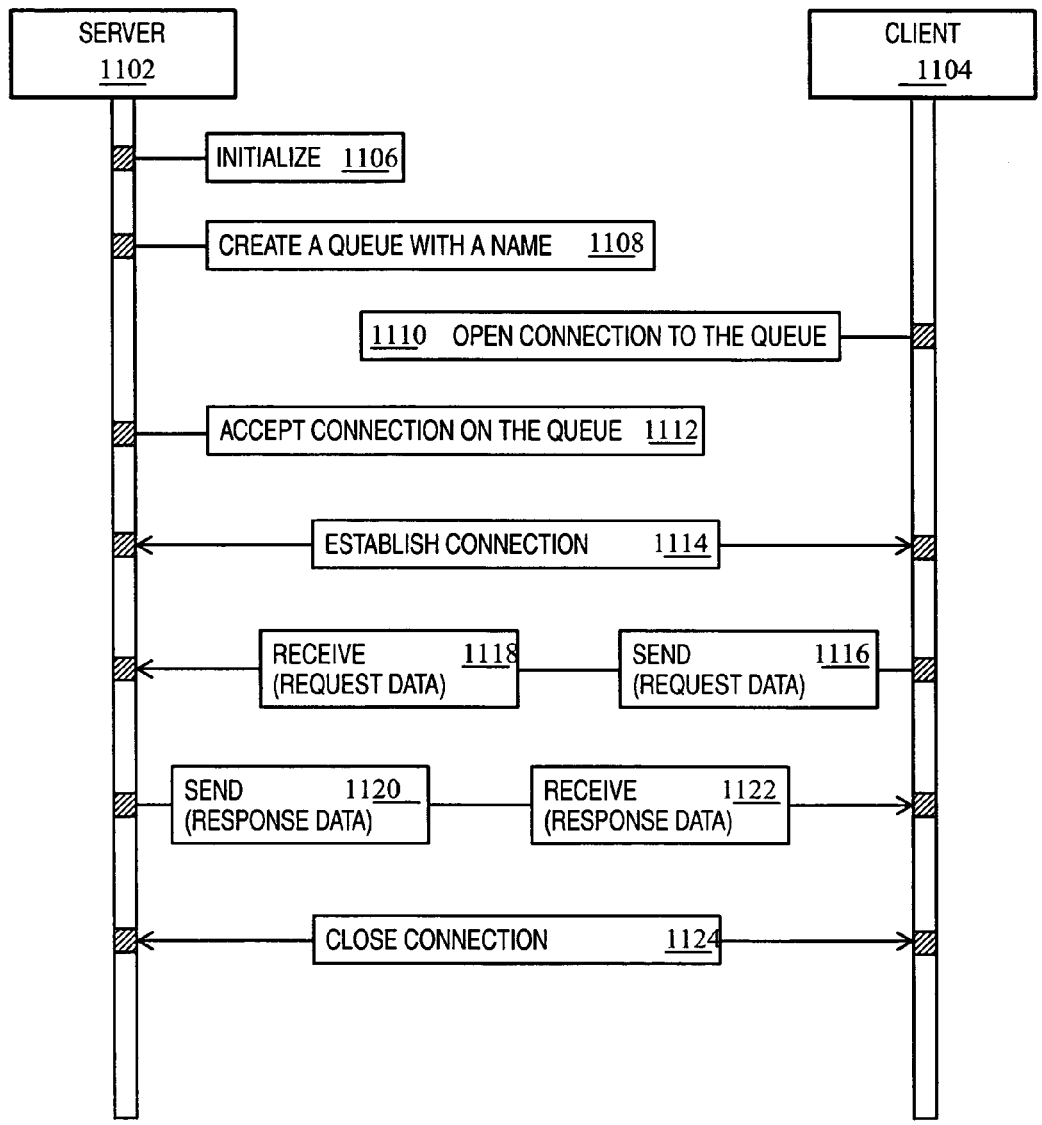
FIG. 11 is a diagram illustrating an embodiment of a transactional sequence between a client and a server using a Fast Channel Architecture-based shared memory.

FIG. 11 is a diagram illustrating an embodiment of a transactional sequence between a client 1104 and a server 1102 using a Fast Channel Architecture-based shared memory. The client 1104 includes an FCA client, while the server 1102 includes an FCA server. First, the FCA library is initialized 1106 at the server 1102. The initialization 1106 is performed once at startup. Then, the server-side request queue is created 1108. The request queue may be created 1108 with a name specified by a parameter name. On the client-side, a new connection object is created 1110 for the specified protocol, which is identified by the FCA protocol. The server 1102 waits for the incoming connection from the client 1104 and once the connection is opened 1110 at the client, the server 1102 accepts the open connection at the queue 1112. In one embodiment, the FCA queue connection is accepted 1112 by the server 1102 by returning an FCA connection handle to the client 1104. With that, the request queue is successfully opened and the connection between the client 1104 and the server 1102 is established 1114 using the FCA-based shared memory.

In one embodiment, once the connection is established 1114, the FCA client 1104 sends 1116 a request to the server 1102. The server 1102 receives the request having request data 1118 from the client 1104. The request is then processed at the server 1102 using various entities and the server 1102 then sends the response data 1120 in response to the request from the client 1104 to the client 1104. The client 1104 receives the response data 1122. The FCA connection is then closed 1124 when it is not longer needed.

Figure 12:
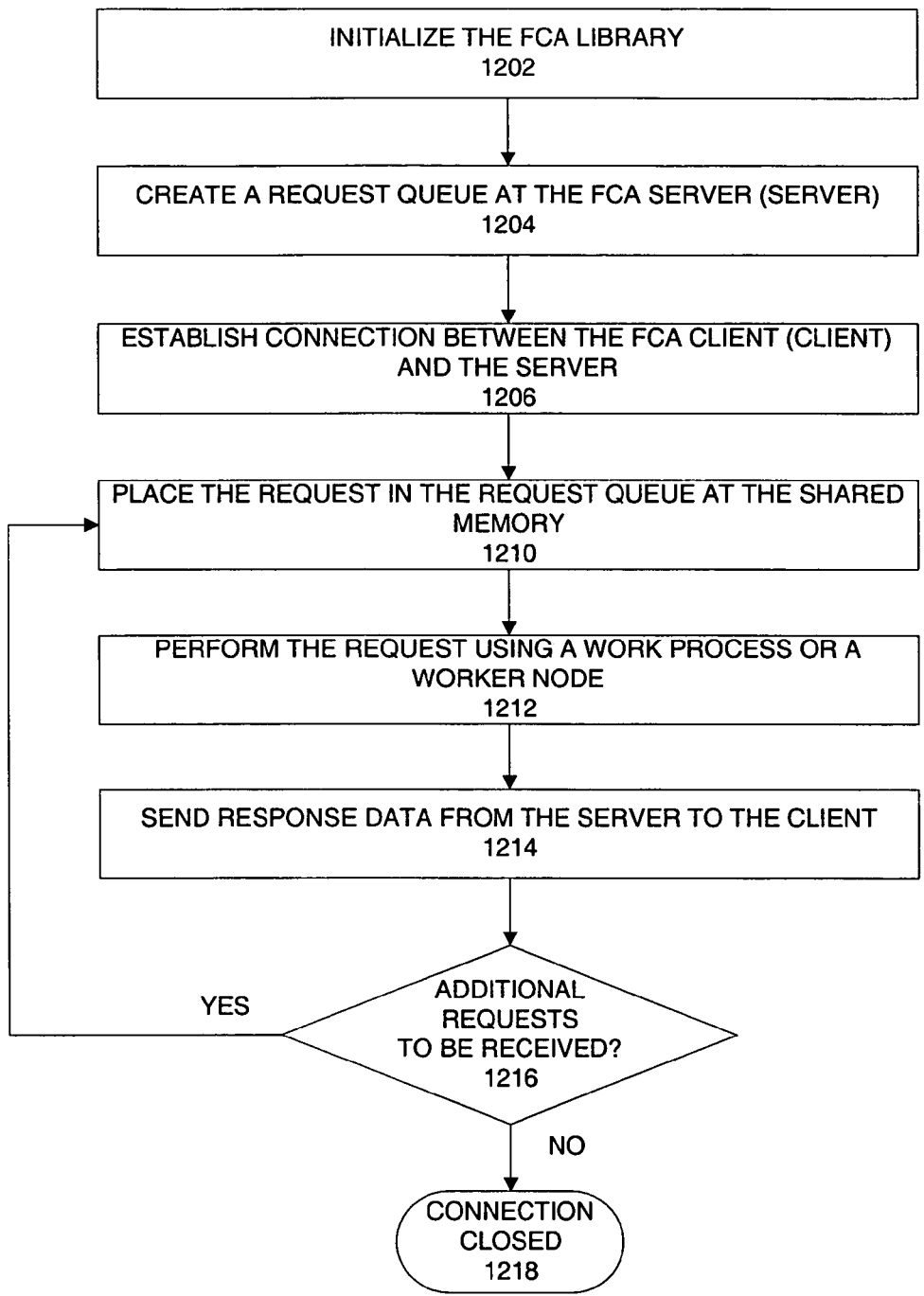
FIG. 12 is a flow diagram illustrating an embodiment of a process for using a Fast Channel Architecture-based shared memory for data processing.

FIG. 12 is a flow diagram illustrating an embodiment of a process for using a Fast Channel Architecture-based shared memory for data processing. First, the FCA library is initialized at processing block 1202. A request queue is then created at the server (e.g., FCA server) at processing block 1204. The FCA-based shared memory is used in that the request queue on the server is created at the shared memory. It is contemplated that several request queues may be created at the shared memory. The open connection from the client is accepted to establish the connection between the server and the client (e.g., FCA client) using the FCA-based shared memory at processing block 1206. The request is placed in the request queue by the client at the shared memory at processing block 1210. The request is then processed at the server using one or more entities and response data is determined in response to the request at processing block 1212. In response to the request, the response data is sent to the client from the server using the shared memory at the FCA at processing block 1214.

At decision block 1216, a determination is made as to whether more requests are to be received. If yes, the process continues with processing block 1210. If not, the connection is closed at termination block 1218.

Figure 13:
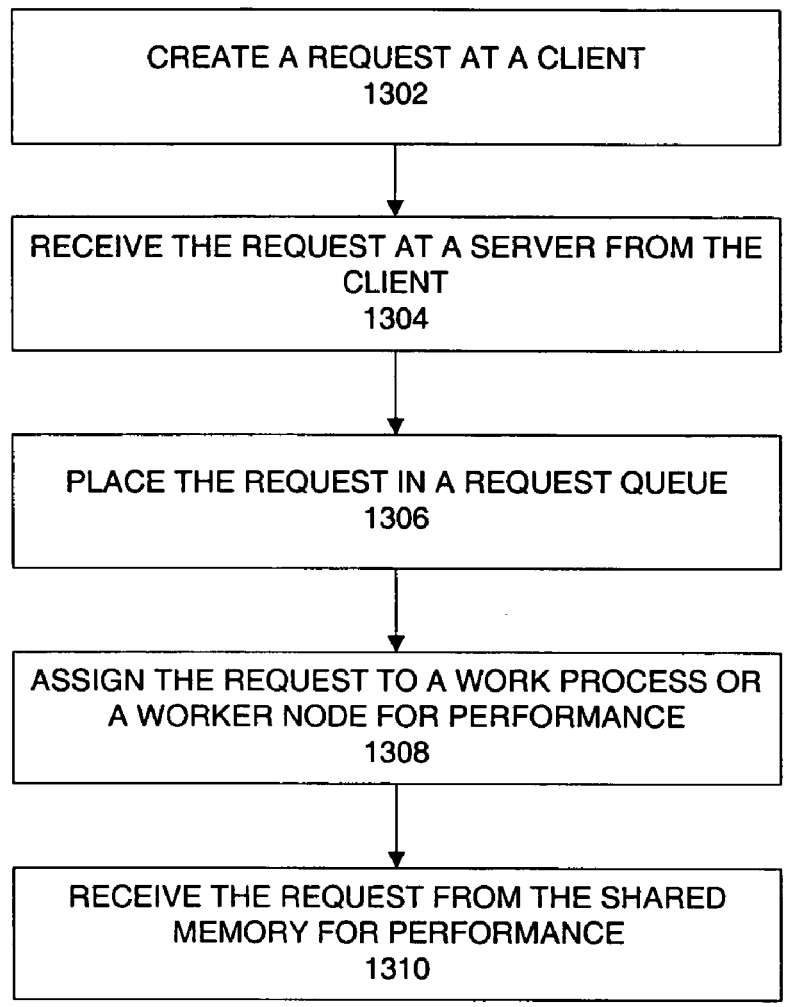
FIG. 13 is a flow diagram illustrating an embodiment of a process for using a Fast Channel Architecture-based shared memory for data processing.

FIG. 13 is a flow diagram illustrating an embodiment of a process for using a Fast Channel Architecture-based shared memory for data processing. At processing block 1302, a request is created at a first FCA client (client). The request is received from a first client at the server at processing block 1304. The request is cached at the FCA-based shared memory and placed in one of the many request queues at the shared memory at processing block 1306.

In one embodiment, the request may be received at the shared memory via the ICM, which may include additional request queues to properly hold, maintain, and distribute the incoming client requests to the shared memory. The request is then assigned to an entity or component, such as an available work process, to process the request at processing block 1308. The assigning of the request for processing includes determining whether the request is ABAP-based or Java-based. For example, an ABAP-based process request is assigned to an available ABAP work process at the ABAP instance, while the Java-based process request is assigned to an available J2EE worker node at the J2EE instance. Having the FCA-based shared memory allows the ABAP and J2EE instances to have direct bi-directional communication via the shared memory.

The assigned request is then retrieved from the shared memory by the available work process or the available worker node so that the request can be satisfied at processing block 1310. The request is then processed at processing block 1312. While the request is being processed by the available work process or worker node, subsequent requests corresponding to various processes are continuously received at the shared memory and are placed in various request queues at the shared memory.

Figure 14:
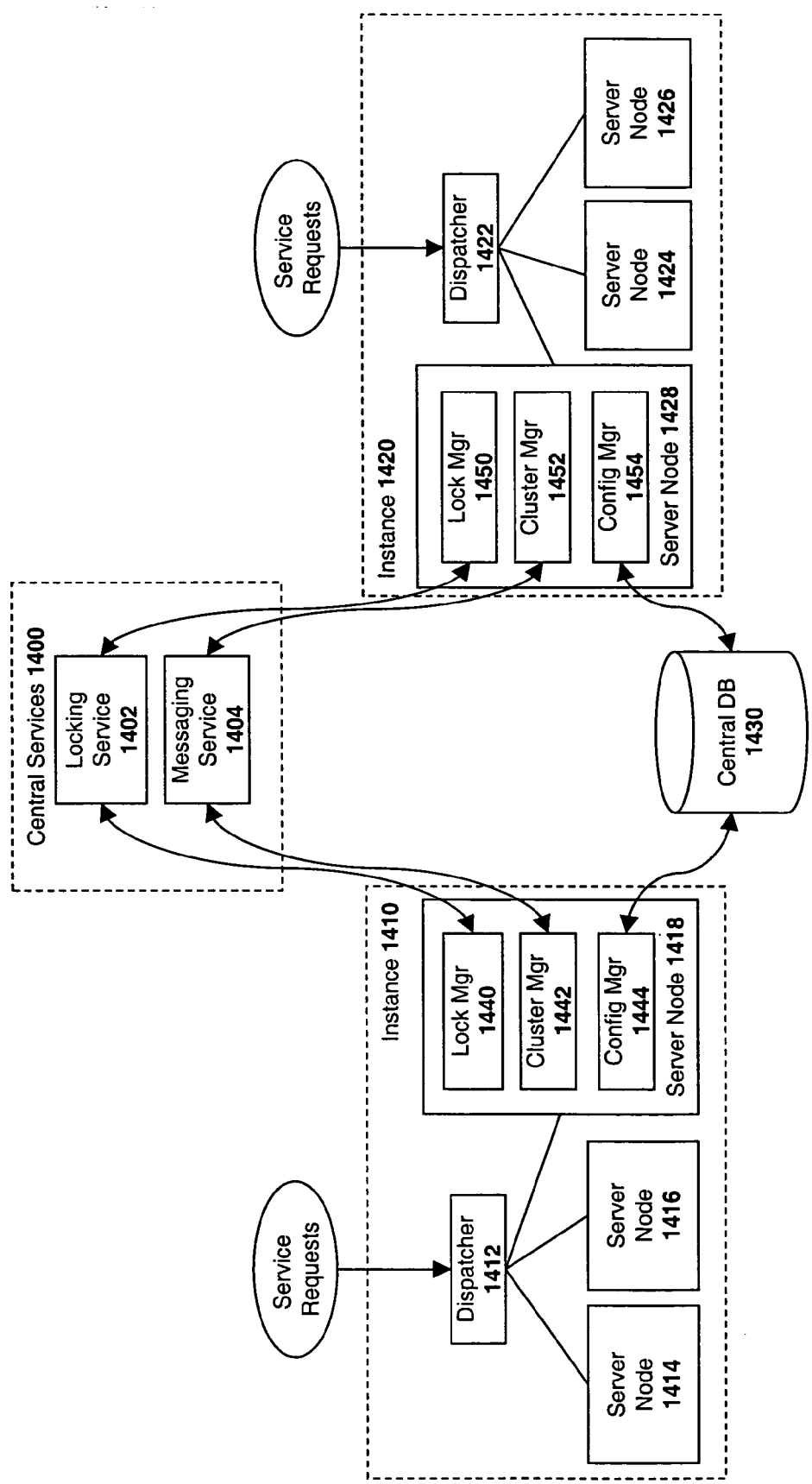
FIG. 14 is a block diagram illustrating an embodiment of a server node system architecture.

A system architecture according to one embodiment of the invention is illustrated in FIG. 14. The architecture includes a central services instance 1400 and a plurality of application server instances 1410, 1420. As used herein, the application server instances, 1410 and 1420, each include a group of sever nodes 1414, 1416, 1418 and 1424, 1426, 1428, respectively, and a dispatcher, 1412, 1422, respectively. The central services instance 1400 includes a locking service 1402 and a messaging service 1404 (described below). The combination of all of the application server instances 1410, 1420 and the central services instance 1400 is referred to herein as a "cluster." Although the following description will focus solely on instance 1410 for the purpose of explanation, the same principles apply to other instances such as instance 1420.

The sever nodes 1414, 1416, 1418 within instance 1410 provide the business and/or presentation logic for the network applications supported by the system. Each of the sever nodes 1414, 1416, 1418 within a particular instance 1410 may be configured with a redundant set of application logic and associated data. In one embodiment, the dispatcher 1410 distributes service requests from clients to one or more of the sever nodes 1414, 1416, 1418 based on the load on each of the servers. For example, in one embodiment, the dispatcher 1410 implements a round-robin policy of distributing service requests.

The sever nodes 1414, 1416, 1418 may be Java 2 Enterprise Edition ("J2EE") sever nodes which support Enterprise Java Bean ("EJB") components and EJB containers (at the business layer) and Servlets and Java Server Pages ("JSP") (at the presentation layer). Of course, the embodiments of the invention described herein may be implemented in the context of various different software platforms including, by way of example, Microsoft .NET platforms and/or the Advanced Business Application Programming ("ABAP") platforms developed by SAP AG, the assignee of the present application.

In one embodiment, communication and synchronization between each of the instances 1410, 1420 is enabled via the central services instance 1400. As illustrated in FIG. 14, the central services instance 1400 includes a messaging service 1404 and a locking service 1402. The message service 1404 allows each of the servers within each of the instances to communicate with one another via a message passing protocol. For example, messages from one server may be broadcast to all other servers within the cluster via the messaging service 1404 (e.g., such as the cache configuration messages described below). Alternatively, messages may be addressed directly to specific servers within the cluster (i.e., rather than being broadcast to all servers).

In one embodiment, the locking service 1402 disables access to (i.e., locks) certain specified portions of configuration data and/or program code stored within a central database 1430 or resources shared in the cluster by different services. The locking manager locks data on behalf of various system components which need to synchronize access to specific types of data and program code (e.g., such as the configuration managers 1444, 1454). As described in detail below, the locking service enables a distributed caching architecture for caching copies of server/dispatcher configuration data.

In one embodiment, the messaging service 1404 and the locking service 1402 are each implemented on dedicated servers. However, the messaging service 1404 and the locking service 1402 may be implemented on a single server or across multiple servers while still complying with the underlying principles of the invention.

As illustrated in FIG. 14, each sever node (e.g., 1418, 1428) includes a lock manager 1440, 1450 for communicating with the locking service 1402; a cluster manager 1442, 1452 for communicating with the messaging service 1404; and a configuration manager 1444, 1454 for communicating with a central database 1430 (e.g., to store/retrieve configuration data as described herein). Although the lock manager 1440, 1450, cluster manager 1442, 1452 and configuration manager 1444, 1454 are illustrated only with respect to sever nodes 1418 and 1428 in FIG. 14, each of the sever nodes 1414, 1416, 1424 and 1426 and/or on the dispatchers 1412, 1422 may be equipped with equivalent lock managers, cluster managers and configuration managers while still complying with the underlying principles of the invention.

Figure 15:
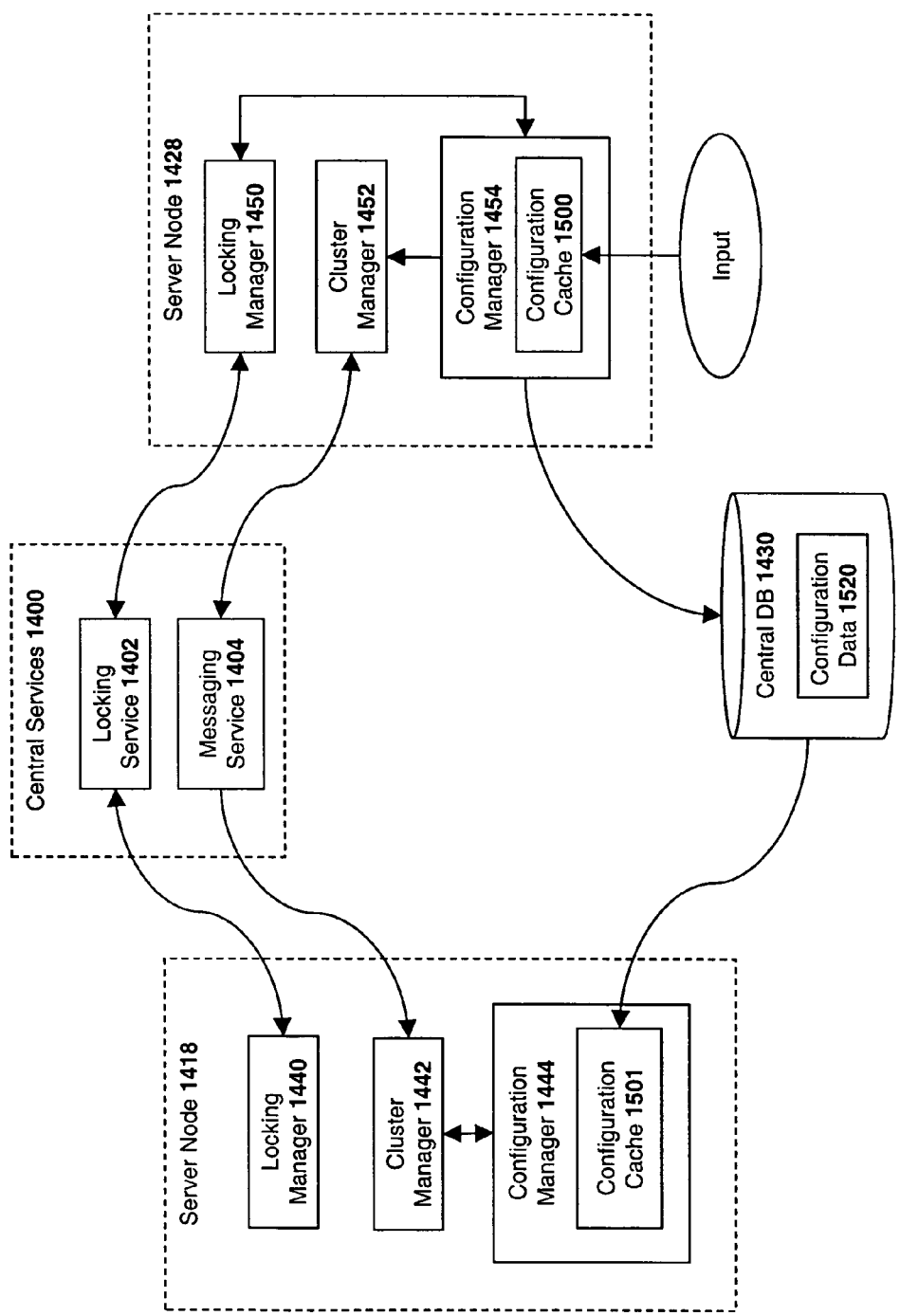
FIG. 15 is a block diagram illustrating an embodiment of a server node architecture which employs a configuration data caching.

Referring now to FIG. 15, in one embodiment, configuration data 1520 defining the configuration of the central services instance 1400 and/or the sever nodes and dispatchers within instances 1410 and 1420, is stored within the central database 1430. By way of example, the configuration data may include an indication of the kernel, applications and libraries required by each dispatcher and server; network information related to each dispatcher and server (e.g., address/port number); an indication of the binaries required during the boot process for each dispatcher and server, parameters defining the software and/or hardware configuration of each dispatcher and server (e.g., defining cache size, memory allocation, . . . etc), and various other types of information related to the cluster. It should be noted, however, that the underlying principles of the invention are not limited to any particular set of configuration data.

In one embodiment of the invention, to improve the speed at which the various servers and dispatchers access the configuration data, the configuration managers 1444, 1454 cache configuration data locally within configuration caches 1500, 1501. As such, to ensure that the configuration data within the configuration caches 1500, 1501 remains up-to-date, the configuration managers 1444, 1454 implement cache synchronization policies, as described herein.

Figure 16:
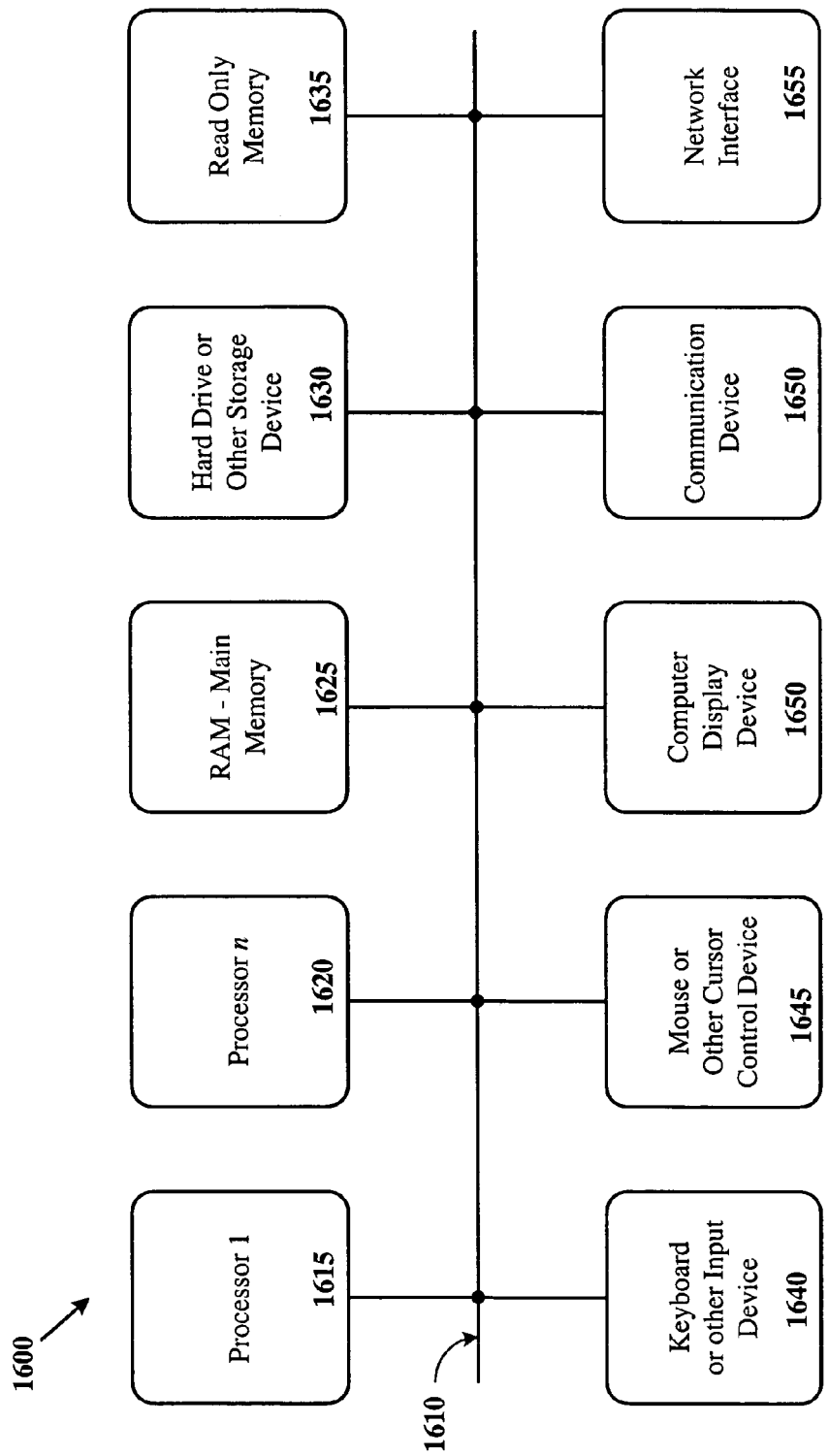
FIG. 16 is an exemplary computer system used in implementing an embodiment of the present invention.

FIG. 16 is an exemplary computer system 1600 used in implementing an embodiment of the present invention. In this illustration, a system 1600 comprises a bus 1610 or other means for communicating data. The system 1600 includes one or more processors, illustrated as shown as processor 1 1615 through processor n 1620 to process information. The system 1600 further comprises a random access memory (RAM) or other dynamic storage as a main memory 1625 to store information and instructions to be executed by the processor 1615 through 1620. The RAM or other main memory 1625 also may be used for storing temporary variables or other intermediate information during execution of instructions by the processors 1615 through 1620.

A hard drive or other storage device 1630 may be used by the system 1600 for storing information and instructions. The storage device 1630 may include a magnetic disk or optical disc and its corresponding drive, flash memory or other non-volatile memory, or other memory device. Such elements may be combined together or may be separate components. The system 1600 may include a read only memory (ROM) 1635 or other static storage device for storing static information and instructions for the processors 1615 through 1620.

A keyboard or other input device 1640 may be coupled to the bus 1610 for communicating information or command selections to the processors 1615 through 1620. The input device 1640 may include a keyboard, a keypad, a touchscreen and stylus, a voice-activated system, or other input device, or combinations of such devices. The computer may further include a mouse or other cursor control device 1645, which may be a mouse, a trackball, or cursor direction keys to communicate direction information and command selections to the processors and to control cursor movement on a display device. The system 1600 may include a computer display device 1650, such as a cathode ray tube (CRT), liquid crystal display (LCD), or other display technology, to display information to a user. In some environments, the display device may be a touch-screen that is also utilized as at least a part of an input device. In some environments, the computer display device 1650 may be or may include an auditory device, such as a speaker for providing auditory information.

A communication device 1650 may also be coupled to the bus 1610. The communication device 1650 may include a modem, a transceiver, a wireless modem, or other interface device. The system 1600 may be linked to a network or to other device using via an interface 1655, which may include links to the Internet, a local area network, or another environment. The system 1600 may comprise a server that connects to multiple devices. In one embodiment the system 1600 comprises a Java® compatible server that is connected to user devices and to external resources.

While the machine-readable medium 1630 is illustrated in an exemplary embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine of the system 1600 and that causes the machine to perform any one or more of the methodologies of the present invention. The term "machine-readable medium" shall accordingly be taken to include, but not be limited to, solid-state memories, optical and magnetic media, and carrier wave signals.

Furthermore, it is appreciated that a lesser or more equipped computer system than the example described above may be desirable for certain implementations. Therefore, the configuration of system 1300 may vary from implementation to implementation depending upon numerous factors, such as price constraints, performance requirements, technological improvements, and/or other circumstances.

It should be noted that, while the embodiments described herein may be performed under the control of a programmed processor, such as processors 202-206, in alternative embodiments, the embodiments may be fully or partially implemented by any programmable or hardcoded logic, such as field programmable gate arrays (FPGAs), TTL logic, or application specific integrated circuits (ASICs). Additionally, the embodiments of the present invention may be performed by any combination of programmed general-purpose computer components and/or custom hardware components. Therefore, nothing disclosed herein should be construed as limiting the various embodiments of the present invention to a particular embodiment wherein the recited embodiments may be performed by a specific combination of hardware components.

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

Similarly, it should be appreciated that in the foregoing description of exemplary embodiments of the invention, various features of the invention are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

While certain exemplary embodiments have been described and shown in the accompanying drawings, it is to be understood that such embodiments are merely illustrative of and not restrictive, and that the embodiments of the present invention are not to be limited to specific constructions and arrangements shown and described, since various other modifications may occur to those ordinarily skilled in the art upon studying this disclosure.

What is claimed is:

1. A method comprising:

employing at an application server a first programming engine for first processes of the application server, the first processes including specialized processes of an operating system of the application server;

employing in at the application server a second programming engine for second processes of the application server, the second processes including specialized processes of the operating system, wherein the first processes and the second processes are independent of each other;

integrating the first application programming engine with the second application programming engine via a communication system having a shared memory;

receiving respective client requests for the first programming engine and the second programming engine at a network communication manager of the application server;

sending each client request of the received client requests from the network communication manager to respective ones of the first processes and the second processes via a communication system of the application server, including for said each client request of the client requests, the network communication manager sending the client request to the shared memory of the communication system being accessed by the first processes and second processes using memory pipes to provide a common access to the shared memory, and one of the first processes and second processes retrieving said client request from one of a plurality of memory pipes of the shared memory; and facilitating bi-directional and unduplicated communication between the first programming engine and the second programming engine via the shared memory, wherein the bi-directional communication via the shared memory is to eliminate duplicate communication of data relating to the first and second processes, wherein the first processes and the second processes are independent of each other including exchanging a message between the first processes and the second processes via one of the plurality of memory pipes of the shared memory, wherein at least one socket is associated with each of the first and second processes, and the sockets are further to serve as a user interface to expose the processes to a user;

wherein the first processes and second processes include one or more of Web Application Server processes, Unix Application Server processes, Microsoft Windows Application Server processes, Oracle Application Server processes, Java System Application Server processes, and Java 2 Enterprise Edition (J2EE) Application Server processes;

wherein the first programming engine comprises an Advanced Business Application Programming (ABAP) engine and the second programming engine comprises a J2EE engine.

2. The method of claim 1, wherein the first processes include first requests having:

receiving first requests at the shared memory; and assigning the first requests to one or more of the first processes.

3. The method of claim 1, wherein the second processes include second requests having:

receiving second requests at the shared memory; and assigning the second requests to one or more of the second processes.

4. A system comprising:

a processor;

a shared memory coupled the processor;

a server having an application server, the application server having a first programming engine for first processes of the application server, the first processes including specialized processes of an operating system of the application server;

a second programming engine for second processes of the application server, the second processes including specialized processes of the operating system, wherein the first processes and the second processes are independent of each other;

a network communication manager to receive respective client requests for the first programming engine and the second programming engine; and a communication system having the shared memory to integrate the first and second programming engines, the shared memory being accessed by the first and second processes using memory pipes to provide a common access to the shared memory, and the communication system to facilitate bi-directional and unduplicated communication between the first application programming engine and the second application programming engine, wherein the bi-directional communication via the shared memory is to eliminate duplicate communication of data relating to the first and second processes, wherein the first processes and the second processes are independent of each other, the communication including exchanging a message between the first processes and the second processes via one of a plurality of memory pipes of the shared memory;

wherein the network communication manager is further to send each client request of the received client requests to respective ones of the first processes and the second processes via the communication system, the sending including for said each client request of the client requests, the network communication manager sending said each client request to the shared memory, and one of the first processes and second processes retrieving said each client request from one of the plurality of memory pipes of the shared memory, wherein at least one socket is associated with each of the first and second processes, and the sockets are further to serve as a user interface to expose the processes to a user;

wherein the first processes and second processes comprises one or more of Web Application Server processes, Unix Application Server processes, Microsoft Windows Application Server processes, Oracle Application Server processes, Java System Application Server processes, and Java 2 Enterprise Edition (J2 EE) Application Server processes, wherein the first programming engine comprises an Advanced Business Application Programming (ABAP) engine and the second programming engine comprises a J2EE engine.

5. The system of claim 4, wherein the application server is further to:

receive first requests at the shared memory; and assign the first requests to one or more of the first processes.

6. The system of claim 4, wherein the application server is further to:

receive the second requests at the shared memory; and assign the second requests to one or more of the second processes.

7. A machine-readable storage medium comprising instructions which, when executed, cause a machine to:

employ at an application server a first programming engine for first processes of the application server, the first processes including specialized processes of an operating system of the application server;

employ at the application server a second programming engine for second processes of the application server, the second processes including specialized processes of the operating system, wherein the first processes and the second processes are independent of each other;

integrate the first programming engine with the second programming engine via a communication system having a shared memory;

receive respective client requests for the first programming engine and the second programming engine at a network communication manager of the application server;

send each client request of the received client requests from the network communication manager to respective ones of the first processes and the second processes via a communication system of the application server, including for said each client request of the client requests, the network communication manager sending said each client request to the shared memory of the communication system capable of being accessed by the first and second processes using memory pipes to provide a common access to the shared memory, and one of the first processes and second processes retrieving said each client request from one of a plurality of memory pipes of the shared memory; and facilitate bi-directional and unduplicated communication between the first application programming engine and the second application programming engine via the shared memory, wherein the bi-directional communication via the shared memory is to eliminate duplicate communication of data relating to the first and second processes, wherein the first processes and the second processes are independent of each other including exchanging a message between the first processes and the second processes via one of the plurality of memory pipes of the shared memory, wherein at least one socket is associated with each of the first and second processes, and the sockets are further to serve as a user interface to expose the processes to a user;

wherein the first processes and second processes include one or more of Web Application Server processes, Unix Application Server processes, Microsoft Windows Application Server processes, Oracle Application Server processes, Java System Application Server processes, and Java 2 Enterprise Edition (J2EE) Application Server processes, wherein the first programming engine comprises an Advanced Business Application programming (ABAP) engine and the second programming engine comprises a J2EE engine.

8. The machine-readable storage medium of claim 7, wherein the instructions when further executed cause the machine to:

receive the first requests at the shared memory; and assign the first requests to one or more of first processes.

9. The machine-readable storage medium of claim 7, wherein the instructions when further executed cause the machine to:

receive the second requests at the shared memory; and assign the second requests to one or more of the second processes.

* * * * *

UNITED STATES PATENT AND TRADEMARK OFFICE
CERTIFICATE OF CORRECTION

PATENT NO. : 7,593,930 B2 Page 1 of 1
APPLICATION NO. : 11/013277
DATED : September 22, 2009
INVENTOR(S) : Braun et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 285 days.

Signed and Sealed this

Twenty-eighth Day of September, 2010

David J. Kappos
*Director of the United States Patent and Trademark Office*